United States Patent [19]
Wical

[11] Patent Number: 5,768,580
[45] Date of Patent: Jun. 16, 1998

[54] METHODS AND APPARATUS FOR DYNAMIC CLASSIFICATION OF DISCOURSE

[75] Inventor: Kelly Wical, Redwood Shores, Calif.

[73] Assignee: Oracle Corporation, Redwood Shores, Calif.

[21] Appl. No.: 455,513

[22] Filed: May 31, 1995

[51] Int. Cl.$^6$ .................................................. G06F 17/30
[52] U.S. Cl. .................. 395/613; 395/622; 395/774; 395/776; 395/793
[58] Field of Search .................................. 382/149, 159; 364/419; 395/22, 148, 600, 700, 622, 613, 774, 793, 776

[56] References Cited

U.S. PATENT DOCUMENTS

| | | | |
|---|---|---|---|
| 4,887,235 | 12/1989 | Holloway et al. | 364/900 |
| 5,146,591 | 9/1992 | Bachman et al. | 395/613 |
| 5,159,667 | 10/1992 | Borrey et al. | 395/148 |
| 5,182,708 | 1/1993 | Ejiri | 364/419 |
| 5,465,308 | 11/1995 | Hutcheson et al. | 382/159 |
| 5,465,321 | 11/1995 | Smyth | 395/22 |
| 5,481,718 | 1/1996 | Ryu et al. | 395/700 |
| 5,544,256 | 8/1996 | Brecher et al. | 382/149 |
| 5,566,333 | 10/1996 | Olson et al. | 395/613 |

OTHER PUBLICATIONS

Zhu, Pattern Classification in Dynamic environments: Tagged Feature–Class Representation and the Classifiers, pp. 1203–1210, Oct. 1989.

Duneau et al, An Improved Classification for Cursive Script Recognition, pp. 842–845, Oct. 1993.

Chu et al, A Pattern Based Approach of Integrating Data and Knowledge to Support Cooperative Query Answering, pp. 615–624, Jun. 1992.

Shen et al, Simulation and Theoretical Results on Cluster Management in Dynamic Hierarchical Networks, pp. 312–324, Feb. 1992.

Peng et al, Rea;ization of Data–knowledge Coordination Model by an Object Deputy Based Method, pp. 140–147, Mar. 1995.

*Primary Examiner*—Thomas G. Black
*Assistant Examiner*—Frantz Coby
*Attorney, Agent, or Firm*—Fliesler, Dubb, Meyer & Lovejoy LLP

[57] ABSTRACT

A dynamic classification system determines content of input discourse. The dynamic classification system includes a dynamic classification system that generates a detailed and comprehensive knowledge catalog based on terminology used in the input discourse. A theme vector processor identifies themes including identifying the relative importance of the themes in the input discourse. The knowledge catalog includes static ontologies arranged in a hierarchical structure, wherein each static ontology contains a plurality of high level knowledge concepts. High level themes extracted from the input discourse are mapped to one or more knowledge concepts in the static ontologies. The dynamic classification system generates one or more dynamic hierarchies, consisting of low level or detailed knowledge concepts, based on themes extracted from the input discourse. The high level themes mapped to the static ontologies are linked to the low level themes in the dynamic hierarchies to generate a world view knowledge catalog. In addition, knowledge concepts in the dynamic hierarchies and static ontologies are cross referenced permitting flexibility to relate one or more groups of knowledge concepts in one or more static and/or dynamic hierarchies. Thus, the knowledge catalog provides both a broad and detailed classification of knowledge for the input discourse.

22 Claims, 11 Drawing Sheets

Microfiche Appendix Included
(34 Microfiche, 1710 Pages)

METHODS AND APPARATUS FOR DYNAMIC CLASSIFICATION OF DISCOURSE

MICROFICHE APPENDICES

Appendix D, entitled "Analysis Documentation" contains four microfiche with a total number of (210) frames.

Appendix A, entitled "Static ontologies" contains one microfiche with a total number of (22) frames.

Appendix F, entitled "Theme Parser Code" contains five microfiche with a total number of two hundred and eighty two (282) frames.

Appendix G, entitled "Code Heading" contains two microfiche with a total number of eighty five (85) frames.

Appendix H, entitled "Oracle Context Linguistics Toolkit Guide Reference" contains four microfiche with a total number of (229) frames.

Appendix I, entitled "Theme Vector Code" contains one microfiche with a total number of sixty three (63) frames.

Appendix J, entitled "Content Indexing Code" contains one microfiche with a total number of seventy one (71) frames.

Appendix K, entitled "Creating a Virtual Bookshelf" contains one microfiche with a total number of (22) frames.

COPYRIGHT NOTICE

Appendices A,B,C,E,F,G,H,I,J and K contain material which is subject to copyright protection. The copyright owner has no objection to the facsimile reproduction by any one of the Appendices as they appear in the United States Patent and Trademark patent files or records, but otherwise reserves all copyright rights whatsoever.

FIELD OF THE INVENTION

The present invention relates to the field of computational linguistics, and more particularly to dynamic classification of input discourse.

BACKGROUND OF THE INVENTION

The ability to accurately classify documents based on the content of the document has a wide range of document search and retrieval applications. For example, the Library of Congress of the United States utilizes a document classification system to store and retrieve documents. Typically, document classification systems, such as the dewy decimal system, are configured in fixed categories. Currently, in order to classify a document, a person familiar with the content of the document manually classifies the document in accordance with the fixed categories. Such a classification system is rigid, and therefore it results in a classification system with limited potential.

In modern society, there is an increasing demand for use of vast amounts of information covering a wide range of topics. In order to best utilize the vast amounts of information, an accurate and detailed classification system is desirable. For example, a person may wish to locate documents on a very specific topic within a more general topic. Without a detailed classification system, the person would be required to read through all documents on the more general topic to locate the more specific topic desired. Therefore, the increased amounts of information in a wide variety of topics or subject matter only increases the problems of classification in fixed categories because greater levels of detail or categories are required to accurately classify documents.

Because of the vast amounts of information, it is impossible to generate a fixed classification system that includes low level detailed topics for all general topics. Therefore, it is desirable to generate a dynamic classification system that includes detailed classification categories based on the content of the document. Furthermore, it is desirable to accurately classify documents without requiring a human to first read the document, and then categorize it based on the readers interpretation of the content of the document.

As is explained below, a dynamic classification system of the present invention generates a detailed and comprehensive hierarchical classification based on, in part, the specific terminology contained in the document. In addition, the dynamic classification system does not require human intervention to read the document to determine a classification category.

SUMMARY OF THE INVENTION

A dynamic classification system generates a detailed and comprehensive knowledge catalog based on terminology used in the input discourse. The dynamic classification system includes static ontologies, wherein each static ontology contains pre-determined high level knowledge concepts arranged hierarchically. The dynamic classification system receives a plurality of themes extracted from the input discourse. The high level themes are mapped to one or more of the high level knowledge concepts in the static ontologies to classify the high level themes. The dynamic classification system generates one or more dynamic hierarchies based on themes extracted from the input discourse. Specifically, the dynamic hierarchies consist of low level or detailed knowledge concepts derived from the extracted themes.

The high level themes mapped to the static ontologies are linked to the low level themes in the dynamic hierarchies to generate a world view knowledge catalog. In addition, knowledge concepts in the dynamic hierarchies and static ontologies are cross referenced permitting flexibility to relate concepts in one or more static and/or dynamic hierarchies. The knowledge catalog provides both a broad and detailed classification of knowledge for the input discourse. The knowledge catalog has application for classifying input discourse based on content.

In one embodiment, the dynamic classification system generates a plurality of head words from the input discourse, wherein the head words represent the lower level themes extracted from the input discourse. For certain head words, the dynamic classification system generates contextual relationships based on use of the head word in the input discourse. The dynamic hierarchies are then generated based on the head words and their contextual relationship with other head words.

Other features and advantages of the present invention will be apparent from the accompanying drawings, and from the detailed description that follows below.

BRIEF DESCRIPTION OF THE DRAWINGS

The features and advantages of the present invention will be apparent from the following detailed description of the preferred embodiment of the invention with references to the following drawings.

DETAILED DESCRIPTION

KNOWLEDGE CATALOG

A knowledge catalog of the present invention provides a unique infrastructure to accurately represent concepts that define knowledge. The knowledge catalog includes a set of static ontologies to define knowledge. The knowledge catalog may be characterized as including several static ontologies because the knowledge catalog provides multiple views, characterizations, and organizations of concepts. As is explained below, the knowledge catalog contains a broad coverage of concepts to provide a world view of knowledge. The static ontologies are configured as hierarchical structures such that knowledge concepts are organized from high level generalized concepts down to more specific concepts. The static ontologies are parallel and independent of each other.

Figure 1A:
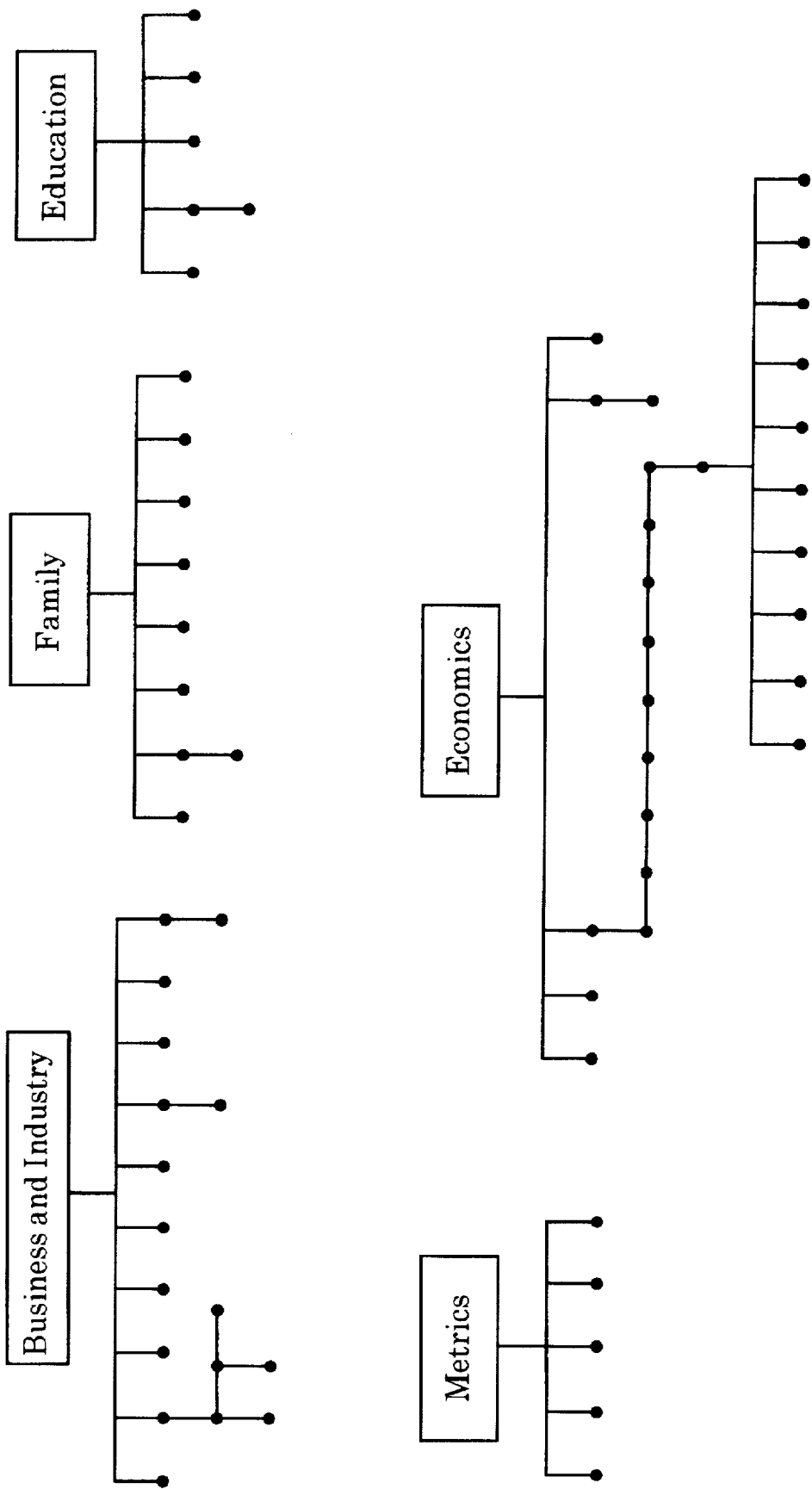
FIG. 1a illustrates several example static ontologies.

FIG. 1a illustrates several example static ontologies configured in accordance with one embodiment of the present invention. Specifically, FIG. 1a illustrates hierarchical structures for the "business and industry", "family", "education", "metrics", and "economics" static ontologies. As shown in FIG. 1a, each static ontology contains a plurality of concepts, illustrated as nodes in the hierarchical structures for the respective static ontologies. For purposes of simplicity, the specific "concepts" are illustrated only as nodes. However, the specific concepts contained within each static ontology hierarchical structure are set forth in Appendix A. Appendix A includes a plurality of static ontologies configured in accordance with the preferred embodiment of the present invention. Although Appendix A provides a set of static ontologies for the preferred embodiment, modifications to the classification or concepts may be made without deviating from the spirit or scope of the invention.

Each ontology shown in FIG. 1a contains a plurality of levels that form the hierarchical structure. For example, the "business and industry" static ontology contains three levels of concept classifications under the highest level concept, and the "economics" contain four levels of concept classifications. Generally, the static ontologies of the present invention includes no more than six levels.

The actual configuration, structure and orientation of a particular ontology is dependent upon the subject matter or field of the ontology. Therefore, each ontology in the set of static ontologies of the present invention contain a different point of view. The different points of view for the static ontologies result in different approaches or different ways of viewing the knowledge concepts in the different static ontologies. Consequently, the organization of the knowledge concepts in each ontology is not consistent. As is explained below, the different points of view for the ontologies permit combining "like" forms of knowledge with "unlike" forms of knowledge through linking of one or more static ontologies.

Although the set of static ontologies are broad to cover a wide range of concepts, they are not extremely detailed. In addition, the set of static ontologies do not contain concepts that are extremely volatile. For an example ontology, a classification for "computers", may contain a sub classification for "operating systems." The sub classification "operating systems" may further include the sub-classification "Windows." However, the particular versions or attributes of the Windows operating system would not be contained in the example computer ontology. Because the static ontologies define a broad range of concepts but not in great detail, they remain relatively stable over time. Therefore, the static ontologies do not require frequent updates.

The ontologies contained within the knowledge catalog of the present invention are organized such that the concepts are independent of language and culture. Therefore, the set of static ontologies in the knowledge catalog of the present invention provide a world view of knowledge. The knowledge concepts in the static ontologies are applicable to all cultures and languages. For example, in the "business and industry" ontology, the concept "commerce and trade" is a sub classification of the top level "business and industry" concept. Under the concept "commerce and trade", the ontology includes the concepts "marketing", "retail trade industry", and "wholesale trade industry." For this example, all cultures engaging in commerce and trade have concepts in marketing, retail trade industry, and wholesale trade industry. Although different words in different languages are used to describe the concepts of "marketing", "retail trade industry", and "wholesale trade industry", these concepts exist in all cultures. Therefore, the "business and industry" ontology, similar to all of the static ontologies, is not dependent on language or culture.

The "business and industry" ontology hierarchy shown in FIG. 1a contains three levels of concepts in the hierarchical structure. With only three levels, the "business and industry" ontology does not contain too much detail by including low level concepts or words that are specific to the business and industry field. For example, an additional category for "Wallmart" may be desired to more specifically classify knowledge beyond the concept of "convenience stores." However, the concept of "Wallmart" is too detailed for the business and industry static ontology because "Wallmart" does not translate across cultures and languages. For this example, in order to classify "Wallmart", the concept is placed in a dynamic level as is explained below.

The static ontologies in the knowledge catalog are in essence a new type of book. For example, a thesaurus provides words with their linguistic connotations. However, a thesaurus does not provide real world culturally independent knowledge concepts, including both semantic and linguistic derivatives of the knowledge concepts. Similarly, a dictionary, which provides definitions and origins of words, does not provide such an organization of knowledge concepts. Also, an encyclopedia, which provides detailed information on a variety of subject matters, does not provide a world view of knowledge as the knowledge catalog of the present invention.

Figure 1B:
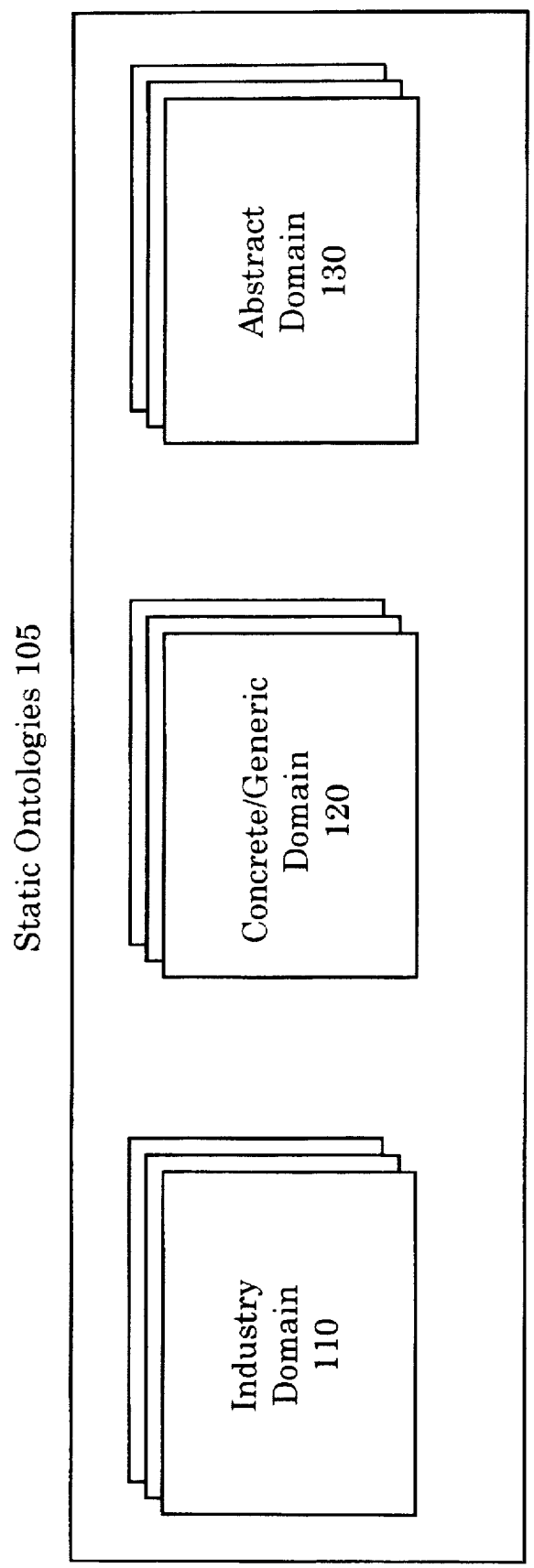
FIG. 1b illustrates a high level conceptualization for a set of static ontologies.

A high level conceptualization for a set of static ontologies are shown in FIG. 1b. For this embodiment, a set of static ontologies 105 are organized in an industry domain 110, a concrete/generic domain 120, and an abstract domain 130. The industry domain 110 includes a plurality of the static ontologies to represent words that define concrete terminology specific to one or more industries or fields of study. There are different types of industry domain 110 ontologies. For example, a classification for "electronics" includes sub-classifications, for "computers" and "micro electronics." Other classifications, such as "geography", are separated into two high level classifications, "political" and "physical" geography. The industry domain 110 separates the political and physical geography classifications because the concepts of political and physical geography are very different, and each classification includes different sub-classifications beneath them.

Some of the set ontologies in the industry domain 110 are not as much industries but rather concrete concepts. For example, "clothing" represents a specific concrete ontology. In the hierarchical structure, some sub-classifications provide factual information for the higher level or parent classification, while other sub-classifications provide more richness to the parent classification. For example, the term "computer program" provides more richness to the parent classification "computer industry." However the term "California avocados" provides factual information for the parent classification "avocados" by representing that the avocados are from California.

As shown in FIG. 1b, for the preferred embodiment, the static ontologies 105 further include the concrete/generic domain 120 and abstract domain 130. The concrete/generic domain 120 contains static ontologies to represent knowledge concepts that have concrete definitions, but may be applicable to one or more specific industries or categories (e.g. the terms are generic). For example, the word "plant", when used to describe a manufacturing plant, is a concrete term that applies to many industries. Therefore, a classification for "plant" is located in the concrete/generic domain 120. The abstract domain 130 contains representations of words that are not concrete, but rather describe abstract concepts. For example, the concepts of "knowledge" and "methods" do not describe material items, but are "abstract" concepts. Although the present invention is described in conjunction with a specific domains (e.g. industry, concrete/ generic, and abstract domains), other organizations may be used to define the static ontologies without deviating from the spirit and scope of the invention.

The static ontologies of the present invention are relational such that the linking of one or more static ontologies, or portions thereof, result in a very detailed organization of knowledge concepts. As described above, each static ontology provides a high level view of a particular subject; however, linking or cross referencing among two or more static ontologies results in many combinations of knowledge hierarchical structures. For example, for the static ontologies shown in FIG. 1a, if a particular classification included concepts in "business and industry" and "economics", then the combination of the "business and industry" and "economics" ontologies provides seven hierarchical levels for that classification. Therefore, the parallel and independent nature of static ontologies, when linked or cross referenced, provides an extremely detailed and comprehensive coverage of knowledge concepts. In order to provide a complete classification hierarchy without cross referencing the independent and parallel ontologies of the present invention, it would require developing a hierarchy that anticipated every combination of knowledge concepts. As can be realized, if this approach is taken for each subject, then setting forth every conceivable breakdown becomes impossible. The groupings of independent and parallel ontologies provide a relational knowledge catalog.

The parallel and independent ontologies of the present invention allow for the greatest amount of flexibility in developing a detailed classification breakdown. For example, a first ontology may include a concept for "geography", and a second ontology may include a concept for "computers." Geography and computers are very different topics, and seemingly unrelated. The "geography" and the "computers" concepts are located in different ontologies due to the very different nature of the subject matter. However, the cross referencing of the "geography" and the "computers" ontologies permits linking the two different subject matters. For example, for the document classification application, a document may be about how different computers are used in different geographical areas.

The hierarchically structured concepts contained within the static ontologies may be semantic derivatives and/or linguistic derivatives of the high level concept. For example, a classification hierarchy may associate a "house" with articles placed within a house, such as dining room tables, chairs, bedroom furniture, etc. For this example, a classification hierarchy that includes semantic derivative concepts based on the "house" concept is desirable. However, for a purely linguistic classification hierarchy, the house "concept" may include types of houses, such as a ranch style house, a contemporary house, etc. The knowledge catalog of the present invention provides the framework or structure to generate hierarchical classifications including both semantic derivatives and/or linguistic derivatives of high level concepts. Utilizing the static ontologies of the present invention, a knowledge map may be generated that links both concepts representing articles placed within a house and concepts representing types of houses to the higher level "house" concept. Consequently, the flexibility provided by the structure of the knowledge catalog permits generation of a true knowledge map.

DYNAMIC CLASSIFICATION SYSTEM

Figure 2:
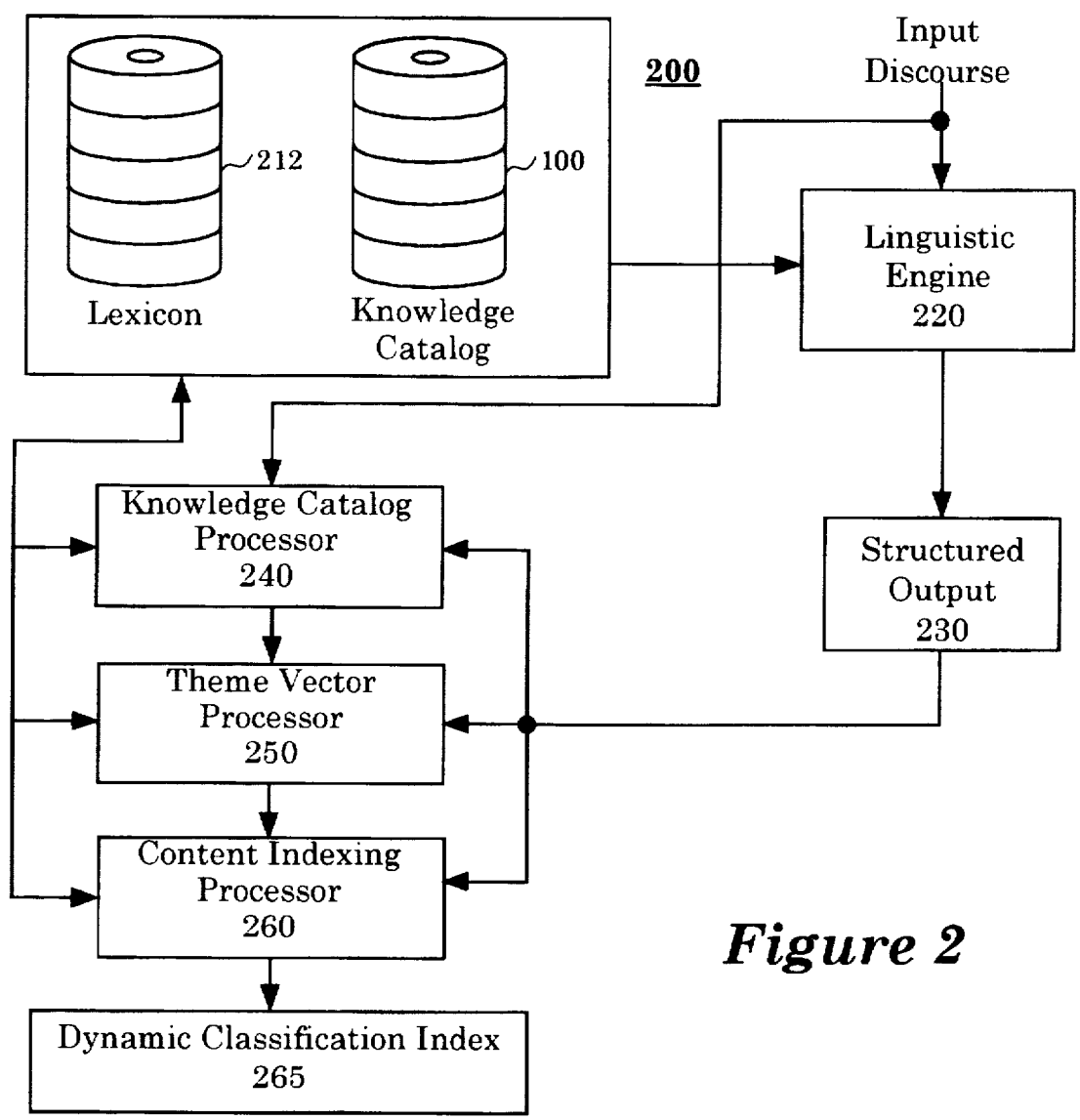
FIG. 2 is a block diagram illustrating a dynamic classification system for input discourse.

FIG. 2 is a block diagram illustrating a dynamic classification system of the present invention. In general, a dynamic classification system 200 receives input discourse, and generates, as output, a dynamic classification index 265. The dynamic classification index 265 contains hierarchical knowledge representations of the input discourse integrated to the static ontologies. The dynamic classification system 200 contains a morphology section 210 coupled to a linguistic engine 220. The linguistic engine 220 receives the input discourse for processing. In general, the linguistic engine 220 processes the input discourse by analyzing the grammatical or contextual aspects, as well as the stylistic and thematic attributes of the input discourse. Specifically, the linguistic engine 220 generates contextual, thematic, and stylistic tags that characterize the input discourse. As shown in FIG. 2, the linguistic engine 220 generates a structured output 230 containing, in part, the contextual, thematic, and stylistic tags. Furthermore, the linguistic engine 220 extracts the topic and content for each sentence in the input discourse.

The morphology 210 includes a lexicon 212 and the knowledge catalog 100 of the present invention. In general, the lexicon 212 contains definitional characteristics for a plurality of words and terms. For example, the lexicon 212 defines whether a particular word is a noun, a verb, an adjective, etc. The linguistic engine 220 utilizes the definitional characteristics stored in the lexicon 212 to generate the contextual, thematic, and stylistic tags in the structured output 230. The generation of thematic tags is described more fully below. Appendix B, entitled "Lexicon Documentation", provides a description of the definitional characteristics in accordance with one embodiment.

The dynamic classification system 200 further includes a knowledge catalog processor 240, theme vector processor 250, and content indexing processor 260. As shown in FIG. 2, the knowledge catalog processor 240, theme vector processor 250 and content indexing processor 260 are coupled to the lexicon 212 and knowledge catalog 100. In general, the knowledge catalog processor 240 receives, as inputs, the structured output 230 including the extracted content, the knowledge catalog 100, and the lexicon 212, and processes the extracted content for use with the knowledge catalog 100. The theme vector processor 250 receives, as inputs, the structured output 230, the processed output from the knowledge catalog processor 240, the knowledge catalog 100, and the lexicon 212. The theme vector processor 250 identifies the most important themes in the input discourse, and maps these themes into the knowledge catalog 100.

The content indexing processor 260 receives as inputs, the definitional characteristics in the lexicon 212, the structured output 230, and theme information from the theme vector processor 250. The content indexing processor 260, in accordance with the dynamic classification system of the present invention, extends the static ontologies 105 into the dynamic level 135 based on the specific terminology contained in the input discourse. Furthermore, the content indexing processor 260 attaches the dynamic level 135 terminology into the concepts in the static ontologies 105 that were mapped by the theme vector processor 250.

As described above, the knowledge catalog 100 describes all senses for a particular word or term. In a preferred embodiment, the content and topic of sentences is extracted in the linguistic engine 220, and is input to the knowledge catalog processor 240 in the form of content carrying words. The dynamic classification system 200 only operates on the content carrying words for which the sense has been determined with a large degree of certainty (e.g. the non ambiguous content carrying words). After determining the sense of content carrying words, the dynamic classification system 200 determines the expressions of content for the input discourse.

The dynamic classification system 200 may be implemented in either hardware or software. For the software implementation, the dynamic classification system is software that includes a plurality of computer executable instructions for implementation on a general purpose computer system. Prior to loading into a general purpose computer system, the dynamic classification system software may reside as encoded information on a computer readable medium, such as a magnetic floppy disk, magnetic tape, and compact disc read only memory (CD-ROM). In one hardware implementation, the linguistic engine 220, the knowledge catalog processor 240, the theme vector processor 250 and the content indexing processor 260 may each comprise dedicated processors including processor instructions for performing the functions described herein. Circuits may also be developed to perform the functions described herein. The lexicon 212 and the knowledge catalog 100 may be implemented as databases stored in memory for use by the dynamic classification system 200.

Figure 3:
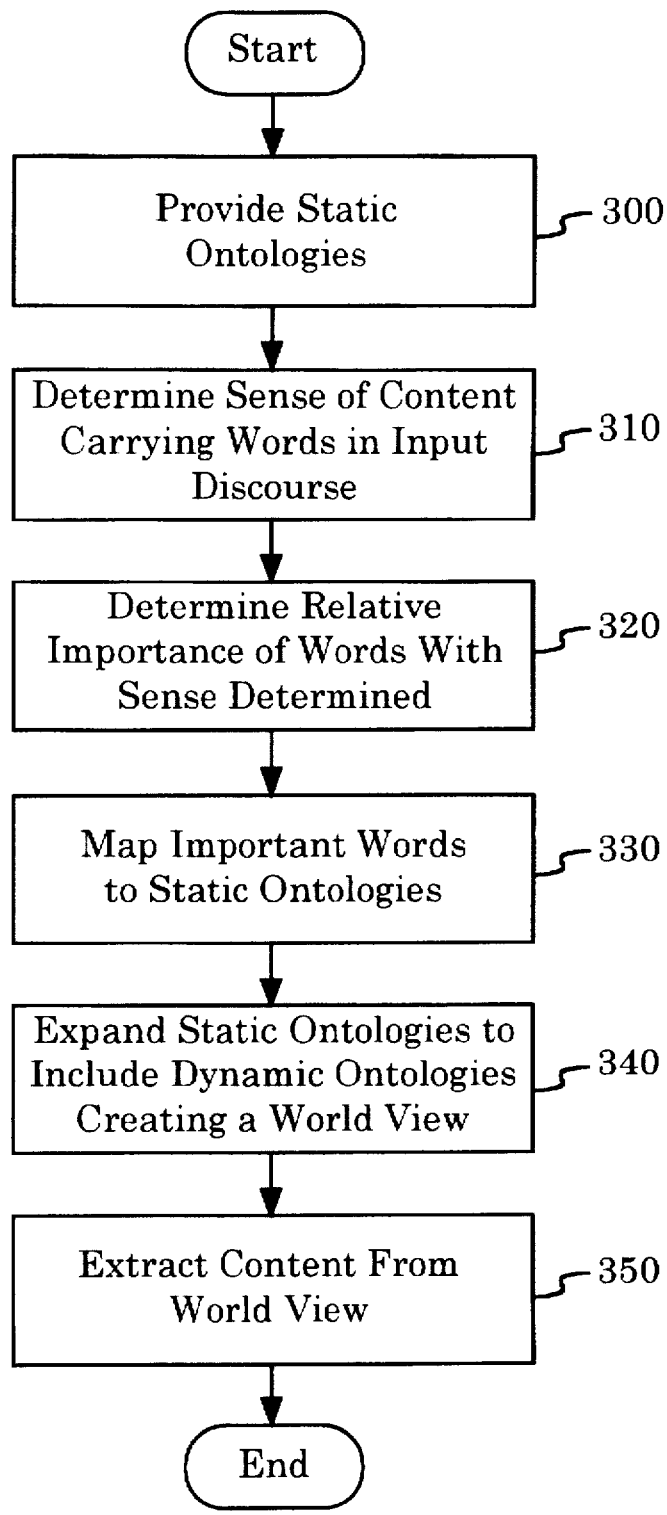
FIG. 3 is a flow diagram illustrating the high level methodology for content processing.

FIG. 3 is a flow diagram illustrating the high level methodology for content processing. The ontologies, such as the static ontologies 105, are provided as shown in block 300. As shown in block 310, the sense of content carrying words in the input discourse are determined. For all words in which the sense has been determined, the relative importance of these words, with respect to each other, are determined as shown in block 320. Based on the relative importance, the words are mapped to the static ontologies to reflect the high level or general concepts disclosed in the input discourse as shown in block 330. As shown in block 340, based on words contained in the input discourse, the static ontologies are expanded to include dynamic ontologies that contains more detailed concepts. The static ontologies and the dynamic ontologies provide a detailed world view of knowledge. The input discourse is dynamically classified using the static and dynamic ontologies, as shown in block 350.

In general, the concepts mapped to the static and dynamic ontologies capture the overall world view content classification of the input discourse. However, through discourse of a document, a combination of the abstract expressions of the knowledge catalog elements represent the actual content of the particular document. Therefore, the concepts from the static ontologies are an abstract representation of input discourse themes in time. The combination of these themes in time represent the actual content of the input discourse.

The knowledge catalog processor 240 processes content carrying words for use by the theme vector processor 250. Specifically, the knowledge catalog processor 240 generates the noun or nominal forms of the content carrying words in the input discourse. The knowledge catalog processor 240 parses the knowledge catalog 100 to compare the content carrying words with the knowledge concepts stored in the static ontologies. If the content carrying word is not contained in at least one domain in the static ontologies, then the word is noted as being not yet understood. If the word is stored more than once in the static ontologies, then the word is classified as ambiguous. If the word is stored only once in the static ontologies, then the word is classified as non ambiguous. If a word is classified as non ambiguous, then the theme vector processor 250 determines the concept of the word from the static ontologies. In a preferred embodiment, a minimum of 50% of the content carrying words must be recognized as non ambiguous.

As discussed above, the knowledge catalog processor 240 generates noun and nominal forms of content carrying words for look-up in the knowledge catalog 100. In order to accomplish this, the knowledge catalog processor 240 reads the grammatical tags in the structured output 230 to determine which words are the content carrying words. The contextual tags determine whether a word carries content. For example, the word "will" could be an auxiliary verb or it could be a noun (e.g. a legal term). As an auxiliary verb, the word "will" carries no content. Using the content carrying words, the knowledge catalog processor 240 separates nouns and non nouns. The non noun content carrying words, such as adjectives, adverbs, and verbs, etc., are converted into nouns or nominal forms. For example, the verb "fishing" is converted to "to fish." The content carrying nouns are further analyzed to determine whether the word has a mass sense and/or a count sense. For example, the word "baseball", which is the mass sense of the word, has a completely different meaning than the count sense "baseballs."

In the preferred embodiment, because the noun sense of a word may be different than the nominal sense, and the mass sense may be different than the count sense, a separate classification or tree attachment exists for nominal and noun forms as well as for mass and count senses. Therefore, the knowledge catalog 100 stores all possible senses of a content carrying word. For example, the noun "a fish" has a different meaning than the verb "fishing" which was nominalized to "to fish." Based upon the above criteria, every content carrying word contains up to four potential pointers into one or more categories in the static ontologies 105. Specifically, each content carrying word may contain a pointer to the static ontologies 105 for the noun form, the nominal form, the mass sense, and the count sense.

In addition to nouns and regular content carrying words discussed above, words in the input discourse may also be characterized as special words. These special words include orienters and global classifiers. Orienter words guide the reader to a field of study regardless of the use of the word. A global classifier word carries the essence of a particular category, wherein the category may include sub categories beneath the category defined by the global classifier. In generating the pointers to the static ontologies, if there is not a concept for the nominal, then the concept of the noun is attached to the concept of the nominal. The special words may be mapped directly into the static ontologies.

After the sense of a majority of the content carrying words has been determined, the dynamic classification system 200 maps key content carrying words into the static ontologies 105. In order to accomplish this, the theme vector processor 250 determines the relative importance of content carrying words in relationship to other content carrying words. The most important content carrying words are mapped to the knowledge catalog elements in the static ontologies 105.

Figure 4:
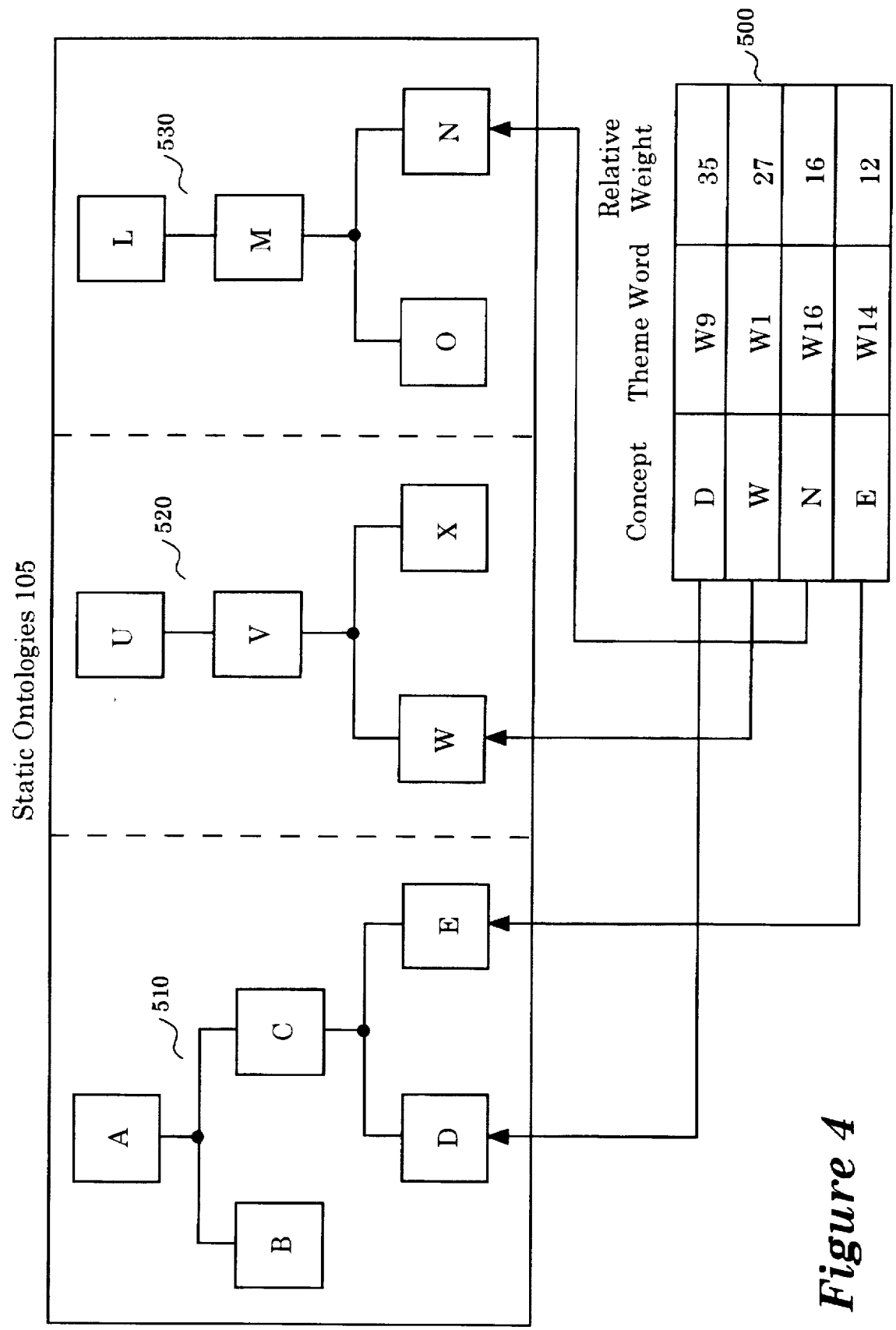
FIG. 4 conceptually illustrates an example of theme vector processing.

FIG. 4 conceptually illustrates an example of theme vector processing. For purposes of explanation, the static ontologies 105 of the knowledge catalog 100 is shown as having three classification hierarchies 510, 520 and 530. Specifically, the database element "A" represents the highest level for the classification hierarchy 510, and the database element "B" and "C" are sub classifications of "A." Also, the classification hierarchy 510 includes sub classifications "D" and "E" linked to the database element "C." Furthermore, as shown in FIG. 4, the classification hierarchies 520 and 530 contain the database elements "U" and "L", respectively, as the high level classifications.

The theme vector processor 250 receives, as an input, the structured output 230 that contains contextual and thematic tags. In addition, the theme vector processor 250 receives the definitional characteristics from the lexicon 212. With this information, the theme vector processor 250 executes a plurality of heuristic routines to generate the relative importance of content carrying words in the input discourse. The theme vector processor 250 only operates on non ambiguous content carrying words or ambiguous words that have been disambiguated. In a preferred embodiment, the theme vector processor 250 generates a theme strength based on the output of the heuristic routines. The theme strength of a particular content carrying word is then used in conjunction with the theme strength of another word to generate a ratio of relative thematic importance between all words.

A theme vector output, labeled 500 in FIG. 4, illustrates several relative theme strengths for a number of words in an example input discourse. As shown in FIG. 4, the ninth word "W9" received a relative weight of 35, and the first word "W1" received a relative weight of 27. Therefore, "W9" has a relative importance of 35/27 in relationship to "W1." The theme vector processor 250 links the most important content carrying words into the ontologies of the static ontologies 105. As discussed above, the theme vector processor 250 only operates on non ambiguous content carrying words. Therefore, the content carrying words are directly mapped into the database elements of the static ontologies 105. For the example shown in FIG. 4, the most important word, "W9", has the "D" concept, and therefore is mapped to the "D" knowledge concept in the static ontologies 105. Note that for this example, the three most important words tie into the ontologies in three separate classification hierarchies. Accordingly, the theme vector processor 250 determines that the three most important concepts in the input discourse are "D", "W", and "N".

In a preferred embodiment, the theme vector processor 250 uses the sixteen most important words of each sentence to map the concepts into the static ontologies 105. If the input discourse consists of a single paragraph, the sixteen concepts are more than enough to capture the content of the document. For a larger document consisting of many paragraphs, the sixteen most important concepts captures the verbal content, and extending beyond the sixteen concepts typically only reinforces the high level concepts that were deemed most important.

After the most important concepts are mapped into the static ontologies 105, the content indexing processor 260 expands additional concepts into the dynamic level 135 of the knowledge catalog 100. In general, the content indexing processor 260 learns how to use content for tie-ins. Terms that fall within the concrete/generic domain 120 and abstract domain 130 are not learned, only terms falling within the industry domain 110 are learned. For example, in a document containing the word "bear", the content indexing processor 260 determines that the sense of bear was used as an animal. Accordingly, the term is attached from the dynamic level 135 up into the animal category in the static ontologies 105.

Figure 5:
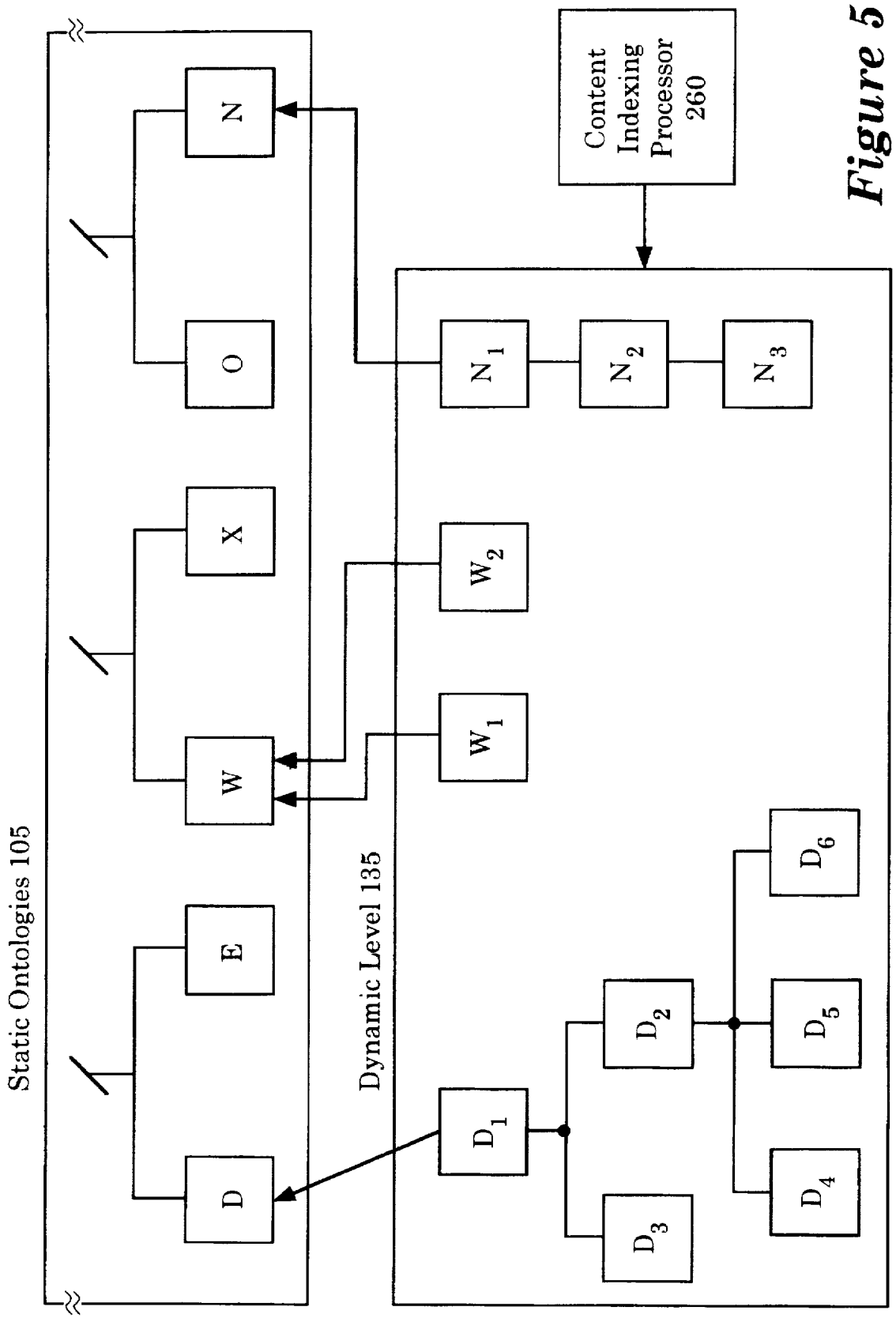
FIG. 5 illustrates an example of expanding the static ontologies into the dynamic level of the knowledge catalog.

FIG. 5 illustrates an example of expanding the static ontologies 105 into the dynamic level 135. The content indexing processor 260 receives, as inputs, contextual and thematic tags from the structured output 230 as well as the output of the theme vector processor 250. From this information, the content indexing processor 260 generates the dynamic classification hierarchies. The example illustrated in FIG. 5 extends the conceptualize example static ontologies illustrated in FIG. 4. The knowledge concept "D" is expanded into the sub classifications $D_1$, $D_2$, $D_3$, $D_4$, $D_5$, and $D_6$. Similarly, for the knowledge concepts "W" and "N", the content indexing processor 260 generates additional sub classifications.

THEME PARSING OVERVIEW

As discussed above, the dynamic classification system 200 utilizes the contextual tags stored in the structures output 230. In one embodiment, the linguistic engine 220 generates the contextual tags via a chaos loop process. Appendix C, entitled "Chaos Processor for Text", contains an explanation for generating contextual or grammatical tags. All words in a text have varying degrees of importance in the text, some carrying grammatical information, and others carrying the meaning and content of the text. In general, the chaos loop process identifies, for words and phrases in the input discourse, grammatical aspects of the input discourse including identifying the various parts of speech. In order to accomplish this, the chaos loop process ascertains how the words, clauses and phrases in a sentence relate to each other. By identifying the various parts of speech for words, clauses, and phrases for each sentence in the input discourse, the context of the input discourse is defined. The chaos loop process stores information in the form of the contextual tags. For a detailed explanation of the contextual or grammatical tags, see Appendix D, entitled "Analysis Documentation."

The theme vector processor 250 also utilizes the thematic tags stored in the structures output 230. Each word carries thematic information that conveys the importance of the meaning and content of the input discourse. In general, the thematic tags identify thematic context of the input discourse, such as text. Each word is discriminated in the text, identifying the type of importance or meaning, the impact on different parts of the text, and the overall contribution to the content of the text. The thematic context of the text is determined in accordance with predetermined theme assessment criteria that is a function of the strategic importance of the discriminated words. The predetermined thematic assessment criteria define which of the discriminated words are to be selected for each thematic analysis unit. The text is then output in a predetermined thematic format.

In addition to the grammatical tags and thematic tags, the structured output 230 also includes outputs for extracted topics, kernel sentences, and extracted content. The knowledge catalog processor 240 utilizes these output areas to generate the content carrying words found in the input discourse. The linguistic engine 220 further includes a topic extractor, that identifies the topics of the input discourse, a kernel generator, that generates summarized versions of the input discourse, and a content extractor that identifies key content of the input discourse. For a complete description of theme parsing to generate the thematic tags, see Appendix E, entitled "Text Theme Parser for Text." In addition, Appendix F, entitled "Theme Parser Code" contains a source code listing for implementing the Theme Parser. Appendix G, entitled "Code Headings", contains a list of defined source code headers corresponding to the theme parser source code of Appendix F. Also, for a further explanation of the thematic output, see Appendix H, entitled "Oracle ConText™ Linguistics Toolkit, Guide and Reference, Release 1.1."

THEME VECTOR PROCESSING

As discussed above, the theme vector processor 250 identifies the most important theme terms and theme concepts for the input discourse for use by the dynamic classification system of the present invention. In order to generate the theme vector output 200, the theme vector processor 250 receives thematic tags and contextual tags from the structured output 230 (FIG. 2). In addition, the theme vector 250 receives the content carrying words from the knowledge catalog processor 240. The content carrying words may include single words or phrases. Note that the content carrying words output from the knowledge catalog processor 240 are converted to the noun or nominal form. In turn, the theme vector processor 250 generates a theme vector output 500 (FIG. 4). In a preferred embodiment, the theme vector output 500 contains, for each theme term, an importance number (#), a theme strength, and a theme concept.

The theme vector output 500 presents a thematic profile of the contents of input discourse (e.g. a sentence, paragraph, or document). The theme vector output 500 contains a list of nominalized words, labeled "Theme Term" in FIG. 4, that represent the major themes in the input discourse. In a preferred embodiment, the theme vector output includes up to sixteen of the most important themes for each sentence, paragraph and document. A theme term in a theme vector is typically based on an actual word or phrase that is contained in the text of the input discourse, or a nominal or plural form of a word. However, the word defining the theme concept may not appear in the input discourse. Instead, the theme concept is conceptualized from the theme term as set forth in a particular ontology stored in the knowledge catalog 100.

In a preferred embodiment, each theme in the theme vector output 500 is assigned a normalized or relative theme strength. The normalized theme strength is calculated using the theme strengths of each theme term in the text that contribute to the particular theme. At the sentence level, the theme vector processor 250 calculates a theme strength for each word in the sentence. The theme strength of the word measures the thematic weight of the word within the context of the sentence in which it appears. Prior to processing, each word receives a default theme strength that varies depending upon the word. As the theme vector processor 250 analyzes the surrounding text in the sentence to determine the thematic role of the word, it increases or decreases the default theme strength for the word. For example, a theme grading determines how each word in a sentence is functioning within the context and structure of the sentence. The theme grading assigned to a word affects the theme strength for the word. For a description of theme gradings, see Appendix H, entitled "Oracle ConText™ Linguistics Toolkit, Guide and Reference, Release 1.1", pages 2–8 to 2–13.

In the preferred embodiment, the theme vector processor 250 executes a plurality of heuristic routines to generate the theme strengths for each theme. Appendix I, entitled "Theme Vector Code", contains a source code listing for implementing theme vector processing in accordance with one embodiment. Appendix I contains source code for generating the theme strengths in accordance with one embodiment. The source code disclosed in Appendix I includes detailed comments to explain the operation of the code. Although the generation of the theme strengths is disclosed as computer source code, the theme strengths may be generated by any means, such as through a hardware implementation, without deviating from the spirit or scope of the invention. Thus, a theme vector identifies the 16 strongest themes in a sentence, paragraph or document in proportion to the sentence, paragraph or document for which the theme vector output is generated.

The theme vector processor 250 returns the concept, if one exists, for each theme term in the theme vector. Similar to the theme terms, the theme concepts in the theme vector output 730 contain a theme strength. As the theme vector processor 250 identifies themes that have the same concept in the input discourse, the theme strength for the theme concept increases. This indicates that the theme concept is significantly developed in the input discourse. As a result, the theme vector processor 250 may promote the theme concept to a separate theme in the theme vector output 730 for the corresponding input discourse. For example, if the theme vector processor 250 determines that "printing press" is one of the theme terms in a paragraph, then the theme concept "printing" is assigned to the theme term "printing press." In addition, the theme vector processor 250 assigns a theme strength to the theme concept. The theme vector processor 250 increases the theme strength for "printing" if the paragraph contains other words such as "bold face" and "typesetting", that conceptualize to "printing." The theme concept "printing" may then appear as a theme term for the paragraph, along with its own theme concept, "publishing industry." In a preferred embodiment, the theme vector processor 250 includes input adjustments (not shown) to prevent promoting theme concepts in a theme vector output 730 to additional theme terms.

The following example illustrates a theme vector output generated by the theme vector processor 250 for input discourse, such as a paragraph. The example paragraph is from a document about commercial banks lowering interest rates based on changes to the Federal funds rate.

> Treasury bill yields dropped substantially Friday morning in anticipation of further reductions in the Federal funds rate by the Fed, market watchers said. The 3-month bill fell 8 basis points to a discount equivalent rate of 7.70%, while the 1-year bill was down 12 basis points to 7.30%.

Table 1 illustrates the theme vector output for the example paragraph. As shown in Table 1, for each theme term, the theme vector output 30 includes a theme strength and a theme concept.

TABLE 1

| # | Theme Strength | Theme Terms | Theme Concept |
| --- | --- | --- | --- |
| 1 | 43 | banking | finance and investment |
| 2 | 25 | basis points | stocks, bonds, and commodities |
| 3 | 24 | treasury bill yields | banking |
| 4 | 22 | stocks, bonds, and commodities | finance and investment |
| 5 | 22 | points | stocks, bonds, and commodities |
| 6 | 21 | yields | banking |
| 7 | 17 | bills | bills |
| 8 | 12 | federal funds rates | banking |
| 9 | 11 | reductions | banking |
| 10 | 10 | rates | banking |
| 11 | 9 | discount equivalent rates | commerce and trade |
| 12 | 9 | three-month | three-month |
| 13 | 8 | 1-year | 1-year |
| 14 | 8 | rates | commerce and trade |
| 15 | 7 | discounts | commerce and trade |
| 16 | 7 | equivalents | equivalencies |

Figure 6A:
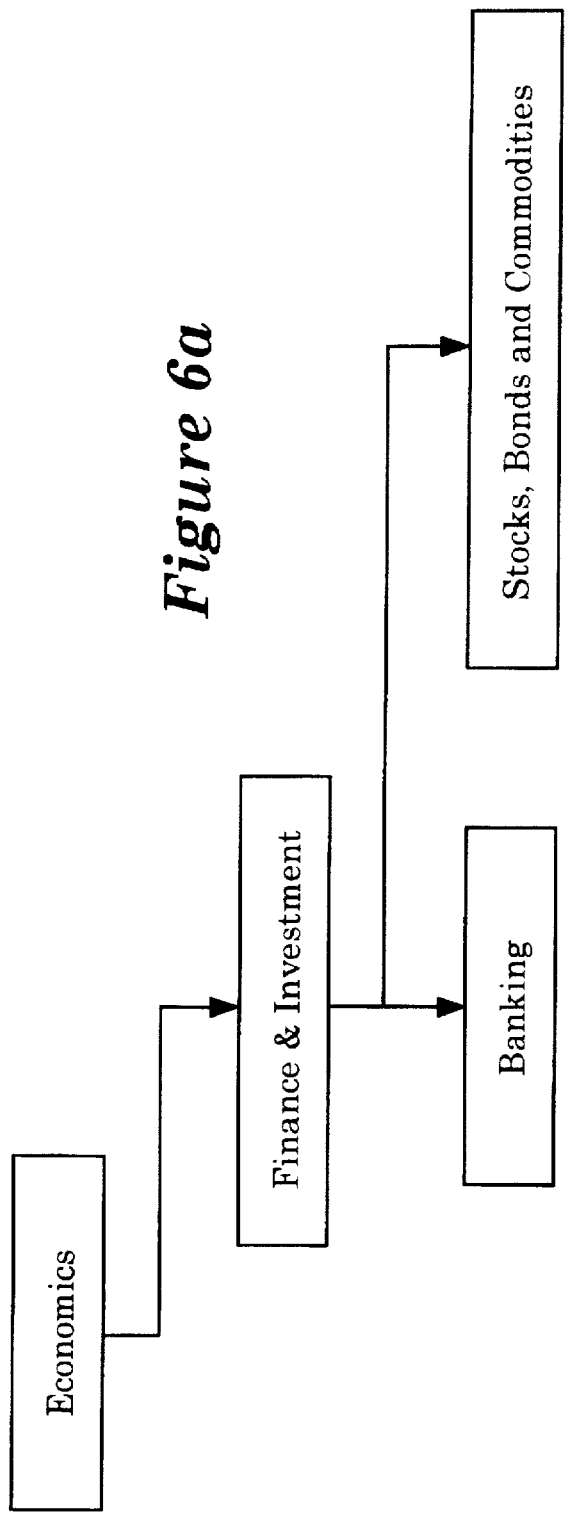
FIG. 6a illustrates a portion of an ontology for "economics."
Figure 6B:
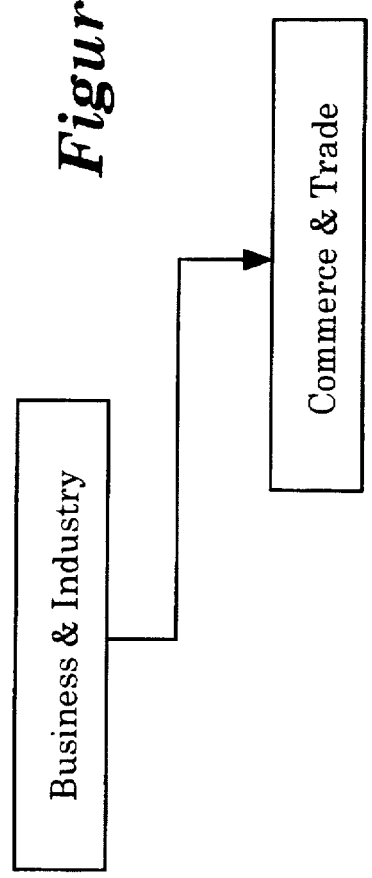
FIG. 6b illustrates a portion of an ontology for "business and industry."

Based on the theme strength, the theme terms are listed in the order of importance or strength in the paragraph. FIG. 6a illustrates a portion of an ontology for "economics", and FIG. 6b illustrates a portion of an ontology for "business and industry." For this example, the theme vector processor 250 maps the theme terms to the above ontologies. This example illustrates the fact that a theme vector output may contain words that are not in the original input discourse. For example, the theme term "basis points" is conceptualized by the theme vector processor 250 to "stocks, bonds, and commodities." The term "stocks, bonds, and commodities" does not appear in the original input example. The theme vector processor 250 also determines that the theme concept "stocks, bonds, and commodities" is developed significantly enough to be designated as the fourth most important theme for the paragraph.

If a theme concept becomes a theme term in the theme vector output, the higher level category from the corresponding ontology is returned as a theme concept. For example, the concept of "banking" is categorized under "finance and investment." If "banking" is a theme concept in the theme vector output, but is also promoted to a theme concept in the theme vector output, then "finance and investment" is returned as the theme concept in the theme vector output.

DYNAMIC CLASSIFICATION

The lower level concepts contained in the input discourse, which are not contained in the static ontologies 105, are classified for the dynamic level 135. The classification in the dynamic level 135 may include several independent and unrelated concepts. Once the lower level theme concepts are generated in the dynamic level 135, these lower level concepts are mapped into the higher level concepts previously mapped in the static ontologies 105. Furthermore, the content indexing processor 260 generates cross references in the dynamic level 135 to reference independent concepts found in the static ontologies 105 or dynamic level 135.

Figure 7:
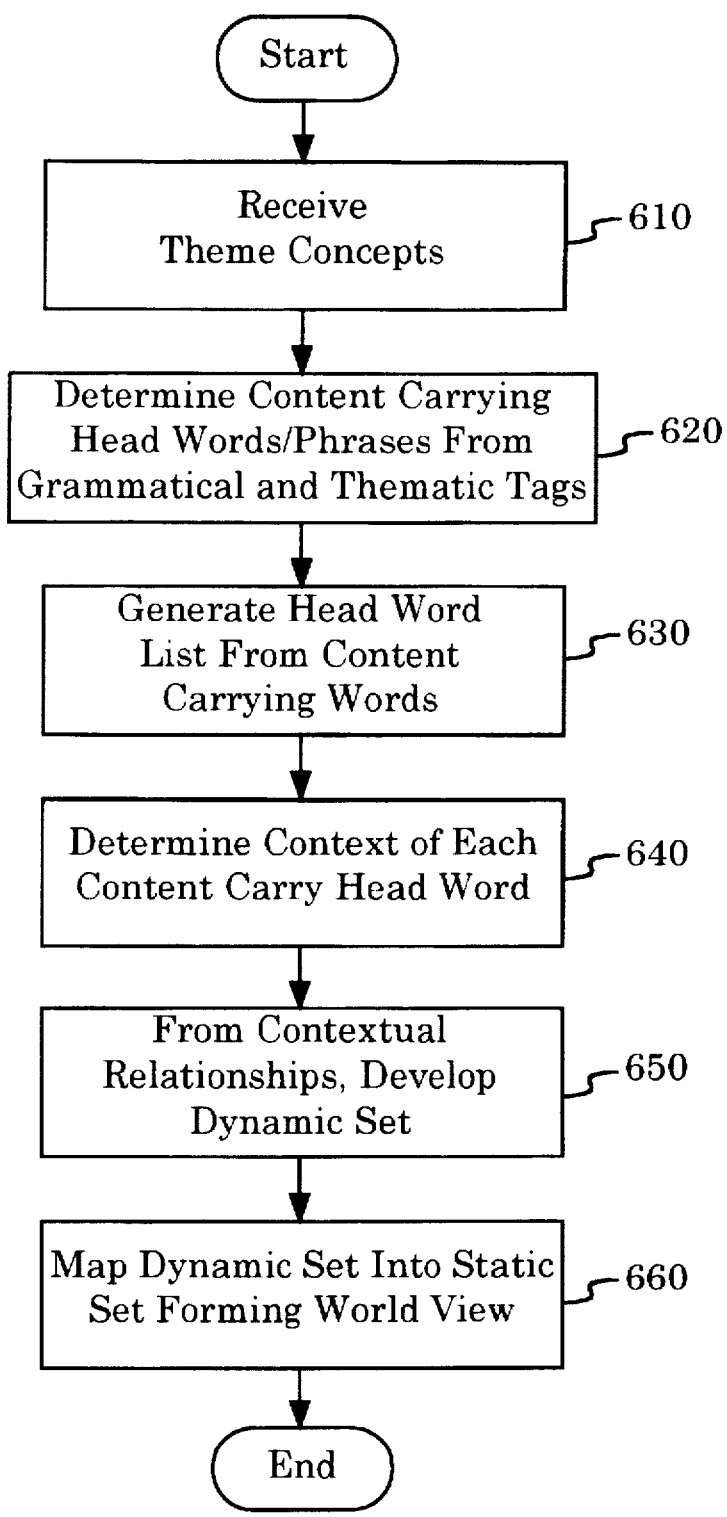
FIG. 7 illustrates a high level methodology for dynamic content indexing.

FIG. 7 illustrates a high level methodology for dynamic content indexing. As shown in block 610, the content indexing processor 260 receives high level theme concepts from the theme vector processor 250. In the preferred embodiment, the static ontologies 105 and dynamic level 135 are based on noun concepts. Based on the grammatical tags and thematic tags, the content carrying words in the input discourse are identified as shown in block 620. The head words represent all content carrying words in the input discourse. Generally, all nouns contained in the input discourse are candidates for head words. The content indexing processor 260 utilizes grammatical and thematic tags to determine nouns that contain little or no content value. For example, the noun "copies", without any additional support, carries little content alone. Therefore, if a noun is characterized as "weak" from the grammatical or thematic tags, then the noun is not utilized as a head word.

At this point, the content indexing processor 260 generates a plurality of head words, wherein each head word carries content. This step is shown in block 630 on FIG. 7. For each head word, at least one contextual relationship is noted as shown in block 640. In a preferred embodiment, the context for each head word is listed hierarchically such that a second contextual relationship to the head word is a more detailed relationship than the first contextual relationship for that head word. From these contextual relationships, the content indexing processor 260 develops the dynamic set as shown in block 650. Specifically, the dynamic hierarchies are generated based on head words and contextual relationships to the head word. After developing the dynamic hierarchies, the content indexing processor 260 maps the dynamic hierarchies into the static ontologies as shown in block 660 forming the world view when complete for all documents. In this way, the dynamic classification system of the present invention classifies the theme concepts presented in the input discourse in the static ontologies 105 and dynamic level 135.

The following indented paragraphs contain an example input discourse for the dynamic classification system. The content of the text is provided as an example only.

> Computers execute computer software programs to provide functionality. In general, computer software programs include applications programs and operating systems. Examples of computer operating systems include UNIX, Windows and OS/2 operating systems. The OS/2 operating system is a proprietary operating system developed by International Business Machines (IBM) Corporation. In general, the OS/2 operating system may be installed on a variety of computer system platforms.
>
> Windows applications, which are directly compatible for use with the Windows operating systems, are not directly compatible for use with the OS/2 operating system. However, due to the large amount of Windows applications software currently available, ways of converting Windows applications for direct compatibility with the OS/2 operating system are under current development.
>
> In recent years, software patents have become increasingly more popular in the computer industry. Due to the potential commercial value of the Windows applications, applications for OS/2 software patents, which cover methods of converting Windows applications for use with the OS/2 operating system, will be made.

The preceding example paragraphs are input to the linguistic engine 220 for generation of the grammatical, stylistic, and thematic tags. The grammatical, stylistic, and thematic tags are provided in the structured output 230 for access in content processing. The knowledge catalog process is executed, and the results are input to the theme vector processor 250. The theme vector processor 250 generates the high level theme concepts contained in the input discourse. For the example input discourse, the high level theme concepts in the first two paragraphs include "computers", "software", and "operating systems." Also, the example input discourse refers to specific operating systems, namely UNIX, OS/2, and Windows. Furthermore, in the third paragraph of the example input discourse, the main theme is "patents", including methods of converting Windows applications to OS/2.

Figure 8:
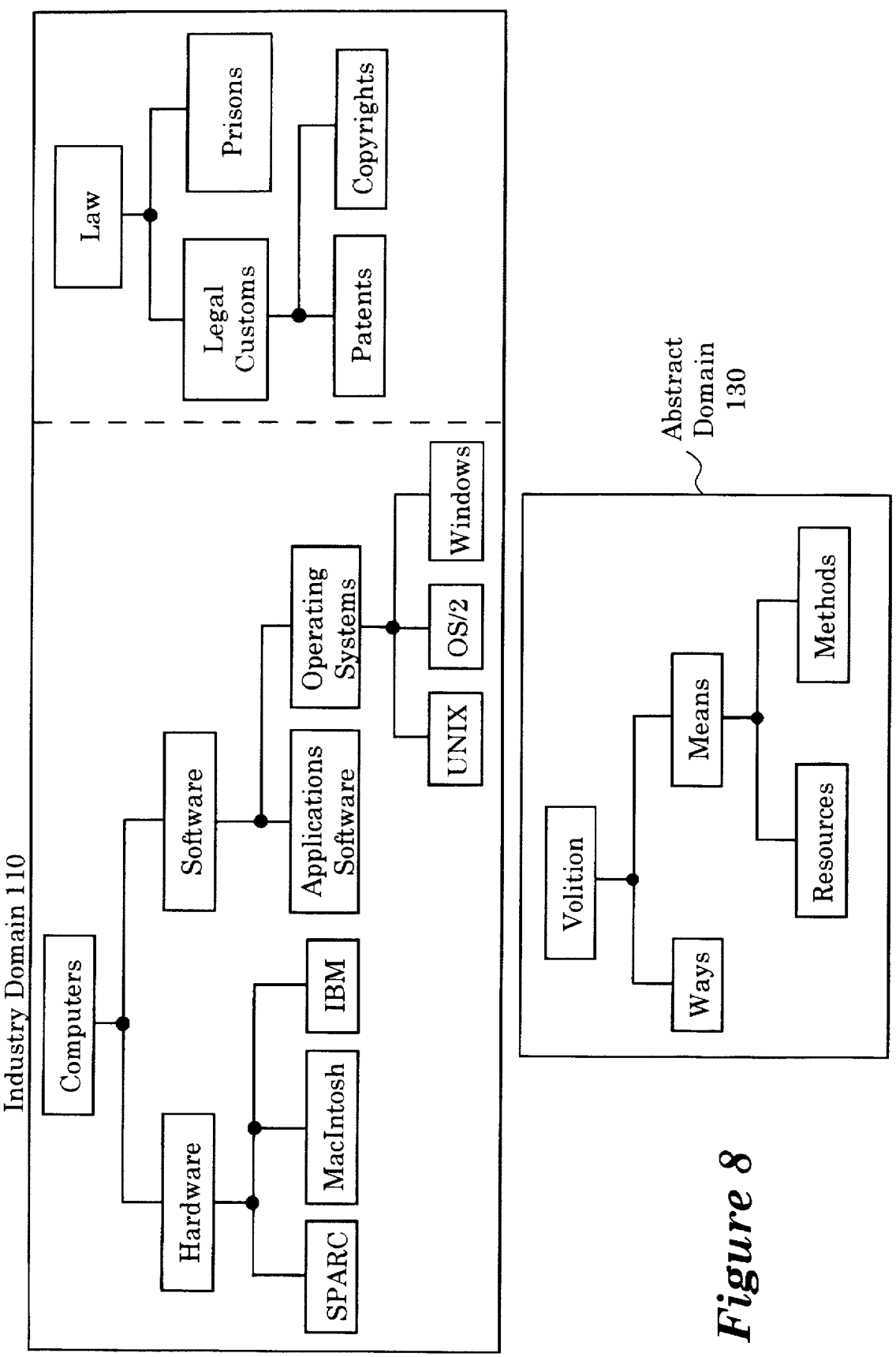
FIG. 8 illustrates example static ontologies for classifying theme concepts.

The theme vector processor 250 maps the high level concepts extracted from the example input discourse into the static ontologies. FIG. 8 illustrates example ontologies for classifying high level theme concepts. For the example input discourse, the industry domain 110 contains two separate ontologies, wherein a first ontology is for "computers", and the second ontology is for "law." For the example ontologies illustrated in FIG. 8, the specific level of detail concludes at a fairly high level. For example, for the classification "computers", three levels of sub classifications are provided (e.g. software, operating systems, and specific operating systems). For this ontology, the theme concepts "computers", "software", "operating systems", "UNIX", "OS/2", and "Windows" map into the static ontologies. However, if the level of depth in the static ontology only included up to the level of, "operating systems", then all high level theme concepts up to and including operating systems are mapped. The high level theme concept "patents" is mapped into the "law" ontology. For the abstract theme concepts located in the abstract domain 130, the theme vector processor 250 maps the concepts "ways" and "methods."

The content indexing processor 260 generates, for the example input discourse, a list of head words that represent the content carrying words in the three paragraphs. Table 2 is a dynamic classification index generated from the example input discourse. The dynamic classification index includes a list of head words generated from the example input discourse. The head words listed in the dynamic classification index of Table 2 are located in each entry at the left margin (e.g. the head words are not indented). As discussed above, the head words are the content carrying words contained in the example input discourse.

As shown in Table 2, for certain head words, the content indexing processor 260 generates one or more contextual relationships to that head word. For example, for the head word "applications", the content indexing processor 260 generates the contextual relationships "for OS/2 software" and "Windows." The contextual relationships generated for the head words are hierarchical such that a first contextual relationship indicates the highest level contextual relationship to the head word, and subsequent contextual relationships indicate more specific contextual relationships for both the head word and the higher level contextual relationship. For the example "applications" head word, "Windows" is a first level contextual relationship and "methods for converting for use" is a second level contextual relationship. For this example, "Windows" is one context in which the head word "applications" refers to in the example input discourse (e.g. the example input discourse refers to Windows applications). More specifically, Windows applications are referred to in the context of methods for converting for use (e.g. the example input discourse refers to methods for converting Windows applications for use).

As shown in the dynamic classification index of Table 2, the content indexing processor 260 also generates references to other theme concepts from the static ontologies. For example, because the example input discourse refers to "applications" in the context of being compatible with operating systems, the content indexing processor 260 references the "operating systems" theme concept.

TABLE 2

| Dynamic Classification Index | |
|---|---|
| applications | operating systems |
| for OS/2 software | installation |
| Windows | OS/2 |
| methods of converting | proprietary |
| for use | [see also] applications |
| [see also] operating systems | [see also] computer software industry |
| | [see also] softwares |
| | [see also] systems |
| applications programs | OS/2 operating systems |
| applications softwares | OS/2 software |
| | applications for |
| commercial values | patents |
| | software |
| | [see also] legal customs and formalities |
| computer hardware industry | platforms |
| [see also] platforms | computer system |
| | [see also] computer hardware industry |
| computer industries | programs |
| | applications |
| | computer software |
| | [see also] computer software industry |
| computer industry | proprietary operating systems |
| [see also] computers | |
| computer software industry | software |
| [see also] operating systems | OS/2 |
| [see also] programs | [see also] computer software industry |
| [see also] software | |
| [see also] systems | |
| computer software programs | software patents |
| computer system platforms | software programs |
| | computer |
| computers | softwares |
| examples of | Windows applications |
| [see also] computer industry | amounts of |
| | [see also] operating systems |
| converting | system platforms |
| methods of | computer |
| | varieties of |
| electronics | systems |
| [see also] industries | operating |
| | [see also] computer software industry |
| | [see also] operating systems |
| examples | UNIX, Windows and OS/2 |
| of computers | inclusion |
| | [see also] operating systems |
| industries | Windows applications |
| computer | methods of converting |
| [see also] electronics | for use |
| legal customs and formalities | |
| [see also] patents | |

Figure 9:
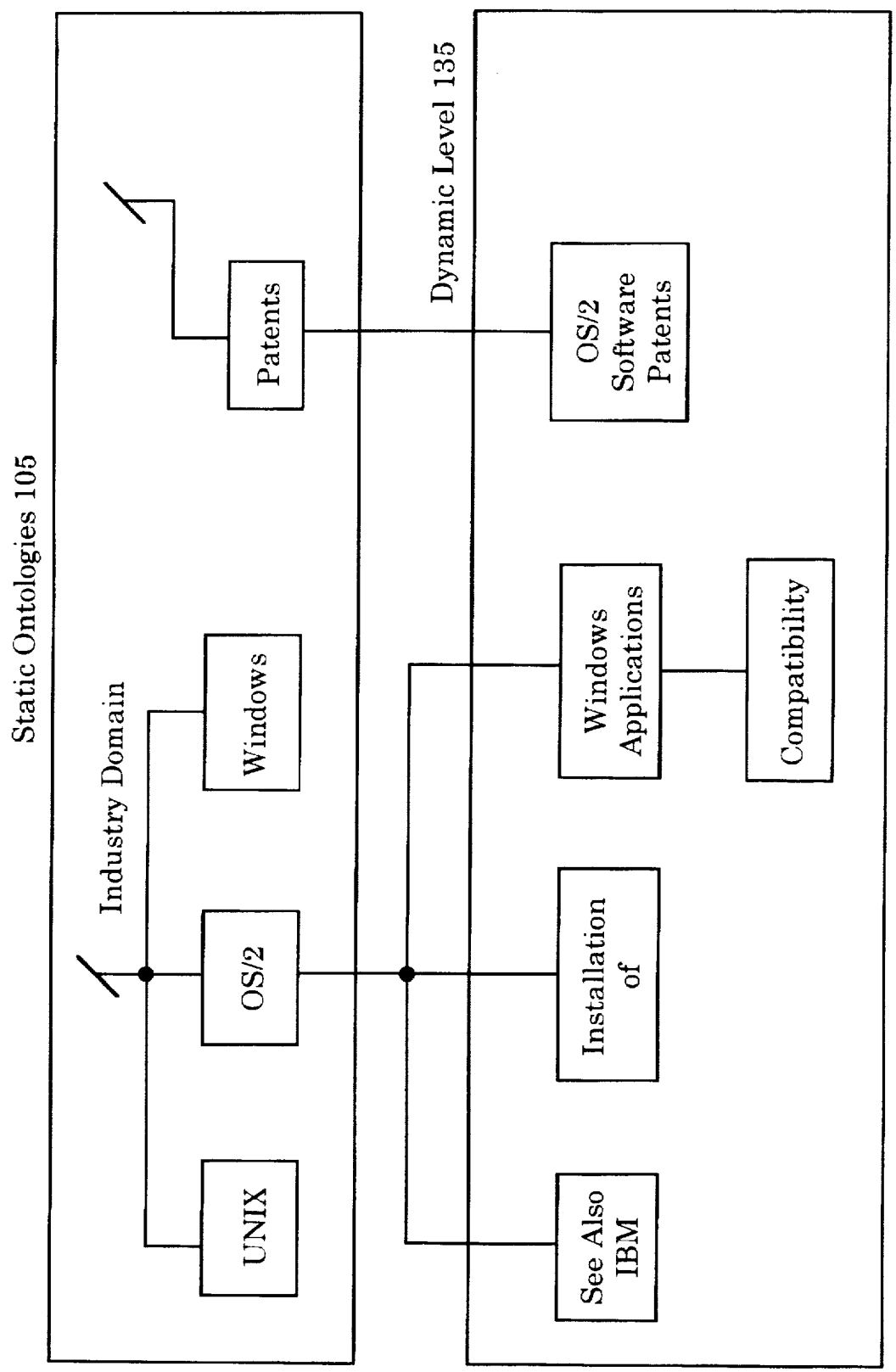
FIG. 9 illustrates a dynamic level hierarchy for an example input discourse.

FIG. 9 illustrates a portion of a knowledge catalog for the example input discourse. For the example input discourse, the content indexing processor 260 generates the dynamic hierarchy in the dynamic level 135 as shown in FIG. 9. In the first sentence of the second paragraph, the head word "Windows Applications" is discussed in relationship to the compatibility of the Windows applications, and is specifically discussed in the context of compatibility with the OS/2 operating system. Based on the grammatical and thematic tags, the content indexing processor 260 determines that the phrase, "which are directly compatible for use with the Windows operating systems", is not the main focus of the sentence. Instead, the focus lies in the "are not directly compatible for use with the OS/2 operating system" portion of the sentence. Based on these relationships, the content indexing processor 260 generates the hierarchical relationship between "Windows Applications" and "Compatibility."

Appendix J, entitled "Content Indexing Code", contains a source code listing for implementing content indexing processing in accordance with one embodiment of the present invention. Appendix K, entitled "Creating a Virtual Bookshelf", discloses examples and use of a classification system.

COMPUTER SYSTEM

Figure 10:
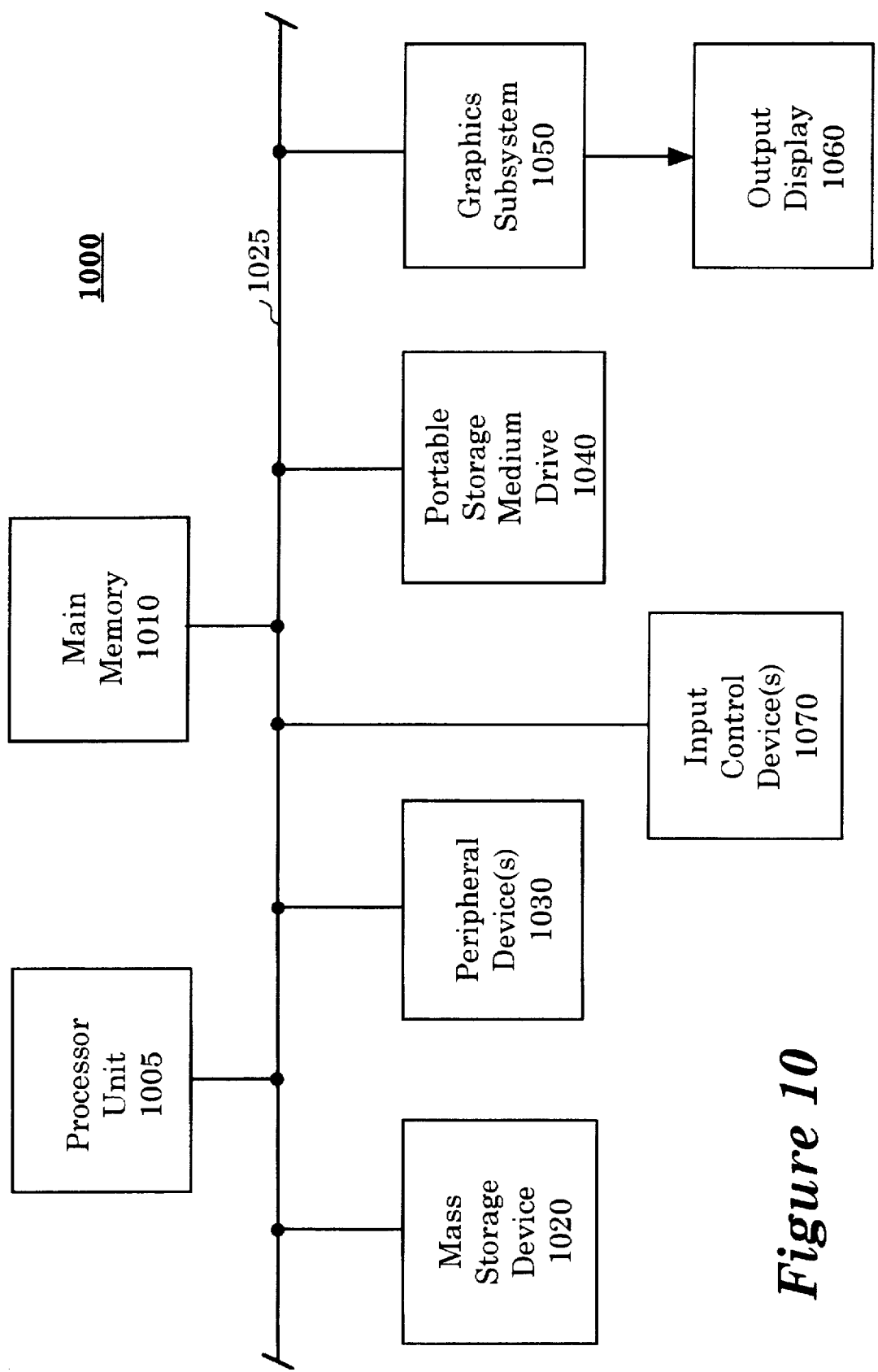
FIG. 10 illustrates a high level block diagram of a general purpose computer system in which the dynamic classification system of the present invention may be implemented.

FIG. 10 illustrates a high level block diagram of a general purpose computer system in which the dynamic classification system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the dynamic classification system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 10 as being connected via the bus 1025. However, the computer system 1025 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may implemented with a magnetic disk drive or an optical disk drive, is a non-volatile storage device for storing data and instructions for use by the processor unit 1005. In one embodiment, the mass storage device 1020 stores the dynamic classification system software embodiment for loading to the main memory 1010.

The portable storage medium drive 1040 operates in conjunction with a portable non-volatile storage medium, such as a floppy disk or a compact disc read only memory (CD-ROM), to input and output encoded data and code to and from the computer system 1000. In one embodiment, the dynamic classification system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the input discourse may be input to the computer system 1000 via a portable storage medium or a network for processing by the dynamic classification system.

The input control device(s) 1070 provide a portion of the user interface for a user of the computer system 1000. The input control device(s) 1070 may include an alphanumeric keypad for inputting alphanumeric and other key information, and a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

THEME PARSER

After the grammatical context, the base thematic context, and the style have been ascertained, the full thematic parse can be implemented. The grammatical context is needed in order to establish the grammatical relationships that exist in a sentence. The style assessments are needed in order to establish the general tone and writing methods used by the author, and the base thematic context is the initial thematic analysis that makes simple decisions about the basic components of the theme when using only the grammatical context for dues. In addition to these contextually calculated aspects of a sentence, additional lexical information that is attached to each word will also be used.

The full thematic context of the document in now produced by checking each word against all possible thematic constructions, and recording either the existence or non-existence of each thematic aspect, or a scale of how much of a thematic aspect each word carries, or what specific sub-classification of a general thematic aspect the word contains. Each word in a sentence is then subjected to a series of tests to determine and record its thematic aspects.

As the detail for the thematic parser is discussed, certain examples will be used to indicate why a particular assessment is useful. Many of these examples will be based on the ability to generate a new, summarized version of a sentence. This assumes that any sentence contains a certain amount of information that can be removed without removing the main 'gist' of the sentence. An example of this would be:

Each word in a sentence is then subjected to a series of tests.

Each word subjected to series of tests.

Each word subjected to tests.

Word subjected to tests.

The subsequent sentences can progressively paraphrase the first, full version. While not fully grammatical, they can be read correctly and easily, without misinterpretation. A common example that will be used in any discussion of weak/strong words will be the ability to readily remove parts of a linguistic constituent group without rendering the sentence unintelligible.

Default Setup

Eight default setup operations are performed before the full thematic parsing can commence:

1. Weak/Strong Noun Initialization
2. Sentence Structure Checking

3. Grammatical Ambiguity Analysis
4. Industry-Specific Terminology Identification
5. Possessive Contextual Form Analysis
6. Dual Gender Noun Initialization
7. Verb Modification Attadunent
8. Noun Support Attachment The first processing step sets the default conditions of each thematic aspect of each word to a zero condition (does not contain this thematic aspect).

Weak/Strong Noun Initialization

A default condition is placed on each noun in the sentence. Each noun carries a thematic aspect recording the strength of the noun. 'Weak' and 'strong' refer to the strength of the word's content-carrying sense. Some nouns are very descriptive when used in isolation, while others are very vague. 'Windmill' is very specific, but 'place' is very vague, and needs some additional information to help define the type of 'place' to which the author is referring. A noun can be encoded in the lexicon as 'strong' or 'weak', or can be computed in the thematic analysis as 'strong' or 'weak'. But each noun initially starts in its thematic processing by assuming it is 'strong'.

The strong/weak labels are referring only to the noun in isolation. A noun that is 'weak' in isolation can still be 'strong' as a unit, as long as it has some strong supporting words, such as adjectives or prepositional phrases. And there can be a number of levels of supporting prepositional phrases. But as long as one of the nouns in one of the prepositional phrases that modifies a particular noun can be classified as 'strong', the whole chain from that point up to the originating noun head can be classified as strong because of this strong support.

There are four conditions that must be thought of together when ascertaining a noun's content value.
1. A noun can be weak, with no support.
2. A noun can be weak with strong support.
3. A noun can be strong with weak support.
4. A noun can be strong with strong support.

Each noun is coded with a thematic aspect tag indicating whether it has supporting content, in the form of strong modifying adjectives or strong postposed prepositional phrases. A noun's initial default condition assumes it does not have strong supporting content.

Basic thematic analysis is highly concerned with the content-strength of words, especially nouns and adjectives. Nouns are the most focal part of a sentence, and can be thought of as carrying a certain amount of content in them. Some nouns are very rich in content and need no additional supporting information to be complete. A word such as 'sonar' is very strong in its content-senses. But words such as 'list' are very weak, and do not convey much information in isolation. Instead they look for other supporting information to help deliver the content of the noun phrase.

'Employee list' or 'list of employees' uses a stronger content word, such as 'employee,' to complete the full content-representation of the word 'list'. Eventually, one aspect of thematic analysis will determine if a noun phrase group (a noun plus its adjectives and supporting prepositional phrases) must be kept intact in order to convey its content properly, or if parts of the phrase can be removed without altering the basic meaning. An example would be 'electric guitar'. 'Electric' conveys additional information about 'guitar', but 'guitar' on its own still provides the basic thematic content. So 'electric' could be removed, which would remove some descriptive detail from the sentence, but would not diminish the basic understanding of the sentence. However, removing 'employee' from 'employee list' would remove the basic content-carrying word, leaving only an empty shell. This would seriously detriment the understanding of the sentence.

Each assessment of theme must understand the gradient levels of content in a sentence, where they exist, and where and when they could be removed without excessive problems. This will be discussed in detail later. But there are some default operations that are performed initially on a word that override certain types of strong/weak analyses.

Sentence Structure Checking

The sentence as a whole is checked for the existence of at least one predicate. If the sentence does not contain a single predicate, it is assumed to be a heading or part of a sentence that cannot be analyzed for thematic content. The entire sentence is therefore marked for removal from the thematic processing routines.

Grammatical Ambiguity Analysis

Each word in the sentence is checked for any grammatical ambiguity. One such condition occurs when the grammar parser cannot assign any parts of speech to a word. In this case, if the word is in a noun phrase, it is defaulted to an adjective. If the word is not in a noun phrase, it is defaulted to a noun. This causes naturally ambiguous grammatical conditions to be focused on more heavily by the thematic routines (since nouns and noun phrases are the most content-rich parts of thematic analysis).

Industry-Specific Terminology Identification

Additional default conditions are based on the existence of certain pieces of lexical information for a word. One such default is based on the use of special industry-specific terminology. Any word that is marked in the lexicon as 'industry oriented' should keep its supporting information, even if the word is deemed to be strong. For example, the word 'yield' may be marked as an important industry-specific term in banking. This would cause phrases such as 'yield on certificates of deposit' to remain together as a complete content unit, when otherwise it may have been logical to think that 'yield' could stand alone. In this case, a default test sets the industry-specific word to 'weak' whenever it has strong supporting information. This helps any application interested in reducing the content of the sentence to keep the supporting terms attached to the head term.

Possessive Contextual Form Analysis

Another default condition arises with the use of strong head nouns with strong, postposed, supporting terms in a possessive-style prepositional phrase. For example, in 'the theft of automobiles', 'theft' could be thought of as being 'strong', but 'of automobiles' is a strong indicator of content and usually needs to be kept associated with the head word. Head words in this context are by default marked as 'weak', but with strong supporting information. They are also marked with a special strong-content code that specifically identifies the head word as conveying strong content, but wants the supporting words to be kept associated with the head word. This helps applications that summarize text to keep the phrase together, but also indicates to content-abstraction applications that the head term conveys strong content in isolation.

Dual Gender Noun Initialization

Another default condition sets the strength of certain dual-gender nouns to 'weak'. If a word is marked as dual-gender, if it has no additional strong supporting context, if it is not in the simple subject position of a clause, and if it is not in a prepositional phrase, then the word is marked as 'weak.' An example is 'They allow manufacturers to offer large discounts'. 'Manufacturers' is marked as 'weak' in this particular context.

Verb Modification Attachment

This thematic aspect concerns itself with the attachment of additional modifying information to verbs. Some verbs require additional adverbial information in order to be fully understood. This additional information could be available in the form of an adverb, an adverbial prepositional phrase, or an adverbial clause. Other verbs accept this additional information when available, and specifically look for it, but can still function properly without it. And still other verbs do not care if it is included or not. These verbs are specifically marked in the lexicon as 'obligatory-adverb required' and 'optional-adverb acceptable'.

The verb 'put' is an example of an obligatory-adverb verb. A sentence such as 'He put the book.' leaves us naturally wanting to know where the book was placed, such as 'on the desk'. But other verbs with the same grammatical context do not convey the same experience. 'He read the book.' does not cause the reader to be looking for additional information modifying 'read', such as 'in a chair' or 'at the office'.

As with the 'weak' and 'strong' nouns, applications that look to summarizing these sentences must be aware of the information that can be easily removed, and the information that causes problems for the reader when it is removed.

In our initial default analysis, before the full thematic assessments begin, several conditions naturally cause verbs to be defaulted to an 'obligatory' or 'optional' condition. Any monotransitive verb that does not have a direct object but that does have an adverbial phrase is coded by default as an obligatory-adverb verb. This causes the adverbial phrase to be retained longer, as would an object to the verb.

Intransitive verbs should have the obligatory-adverb setting, causing any adverbial phrases to be linked more directly to the verb. And verbs that signal 'unmarked' infinitive clauses are marked as optional-adverbial, causing the infinitive clause to be carried with the verb. An example of this type of sentence is 'Bob had three people guard the door.'. 'Had' signals the allowance of the unmarked infinitive 'guard'. This sentence would feel very incomplete if this clause were removed when a summary of the sentence is generated.

Finally, ditransitive verbs with only one object set the optional-adverb flag to indicate that any adverbial information be strongly attached to the verb, filling in for the missing object.

Noun Support Attachment

As a last stage in the preprocessing theme section, each word is analyzed to determine if strong support exists for it. The strong support assessment will be used along with the strong/weak noun thematic assessments to determine if the word is a focal point for a strong point as a whole.

MAIN THEMATIC ASSESSMENTS

After the initial setup routines are complete, each word is processed through the main thematic assessment routines. These routines attach flags to each word/phrase that indicates its thematic character. Each theme routine will have a short explanation, examples where needed, and sample abstract syntactic representations that indicate the abstract nature of the sentence context that is necessary for the routine.

The thematic assessments are a series of tests made against each word/phrase in the exact context of the sentence. Each test records the existence or degree of applicability of each of the theme routines to the word/phrase. The collection of the grammar, style, base theme, and these thematic assessments together will provide the necessary information that applications need to rewrite sentences and extract group of content.

There are three main types of thematic assessments:
1. Major Thematic Assessments
2. Theme-Relational Tagging
3. Theme-Location Identification Major Thematic Assessments Major thematic assessments contain all of the routines necessary to make major assessments about the overall theme of the sentence. There are 210 such routines, each of which produces an output to be stored for each word/phrase in the thematic context output.

AddAdv: Identifies 'additive adverbs' functioning in an adverbial role. Additive adverbs indicate that the predication is additionally true about the referent under focus. Based on the exact context of the sentence, this flag is set when an additive adverb is not essential to the meaning. The adverb may occur in any contextual position in the sentence.

ex: Mary also could play the banjo.

The banjo similarly has the dynamic range of a chainsaw.

AdjAdvSubordination: Identifies adjectival and adverbial clauses that are not essential to the meaning or to the grammatical integrity of the sentence. Most non-contrastive type sentence level adverbial clauses are tagged, and most adjectival clauses that modify strong nouns are tagged. If the adjectival clause carries strong content information and the noun it modifies is weak, then the clause is not tagged. Adjectival clauses that have no strong elements are tagged even if the noun being modified is weak and needs support.

ex: After they had voted, the race was run on Sunday.

The main idea that he had was never implemented.

AdjDeterminer_b: Identifies determiners that modify plural count nouns or mass nouns, and that are not essential to the meaning or to the grammatical integrity of the sentence. They must be used as a determiner in the context of the sentence.

ex: I don't have enough strength to lift the box.

AdjectiveNotDet: Identifies adjectives that are not determiners, and that are not essential to the meaning. The adjective must occur in a noun phrase, and be marked as a weak adjective in the lexicon.

ex: A large cat jumped off the roof.

AdjectivalClause: Identifies adjectival clauses that are not essential to the meaning. If the adjectival clause carries strong content information and the noun it modifies is weak, then the clause is not tagged. If the clause contains no strong information, then it is tagged, even when the noun being modified is weak.

ex: The main idea that he had was never implemented.

AdjectivalPrepPhrase: Identifies adjectival prepositional phrases that are not necessary to the meaning. If the noun being modified by the prepositional phrase is weak and the prepositional phrase carries strong content, the phrase is not tagged. If the prepositional phrase contains no strong information, it is tagged, even if the noun it modifies is weak.

ex: My physics book with the torn pages was lost.

AdjSubjComp: Identifies adjectives functioning as subject complements that are not essential to the grammatical integrity of the sentence. These adjectives will be marked as weak in the lexicon.

ex: The box was large.

Adverbs: Identifies adjunctive adverbs that are not essential to the meaning or to the grammatical integrity of the sentence. The adverb may appear in any position in the sentence, and may modify any valid constituent.

ex: The bear quickly ran into the forest.

AdverbAfterVerb: Identifies adverbs (usually adjuncts) directly following verbs where the adverb is not essential to the meaning. It is essential only when the verb it modifies is marked in the lexicon as an obligatory or optional adverb-type verb.

ex: The bear ran quickly into the forest.

AdverbEndMc: Identifies adverbs (usually adjuncts) ending a main clause where the adverb is not essential to the meaning (when the verb in its clause is not an obligatory or optional adverb type verb).

ex: The bear ran into the forest quickly.

AdverbialNpInit: Identifies introductory noun phrases of time. The noun phrase may occur at the start of any main clause, must have a time noun as its head, and must be only a noun phrase, not a prepositional phrase or any other constituent.

ex: Early that morning, we set off for camp.

AdverbInit: Identifies adverbs (usually disjuncts) that start a main clause where the adverb is not essential to the meaning. It is essential to the meaning only when marked in the lexicon as an orienter, such as the words 'economically' or 'linguistically' which name industries or specific fields of study.

ex: Actually, they left for the store.

AdvClauseInit: Identifies adverbial clauses at the beginning of a main clause that are not necessary to the meaning. Only those clauses that contrast to the information in the main clause will not be tagged.

ex: After they had voted, the race was run on Sunday.

AdvInNp: Identifies adverbs in noun phrases that are not essential to the grammatical integrity of the sentence. This includes any adverb but those marked as orienters.

ex: It was an unusually comical movie.

AdverbSplitIfin: Identifies adverbs in split infinitives.

ex: . . . to boldly go where . . .

AdverbialBetweenCommas: Identifies adverbial phrases set off by commas, which are not essential to the meaning or to the grammatical integrity of the sentence. This includes all adverbials that are not orienters.

ex: The bear was, at least partially, standing on its hind legs.

AdverbialClause: Identifies adverbial clauses that are not necessary to the meaning. These include most non-contrastive adverbials.

ex: When the right times comes, I am going to learn to fly a plane.

AgoAdverbial: Identifies time representations that end in 'ago' or similar words, which are not necessary to the grammatical integrity of the sentence.

ex: I took the test some years ago.

Appositive: Identifies all appositives in any context.

ex: Bob Smith, a market analyst, said . . .

ApproxPrep: Identifies 'approximator prepositions' such as 'around, about, close to' where the prepositional phrase is not essential to the meaning. The phrase will be necessary only when it modifies a verb marked as obligatory or optional adverbial, or when the prepositional phrase contains strong content and the noun it modifies is weak.

ex: Bob left the party around ten o'clock.

Article: Identifies articles (determiner type).

ex: The bear ran down the road.

AttitudeAdv: Identifies 'attitudinal adverbs' functioning in an adverbial role where the adverb is not essential to the meaning.

BeVerb: Identifies all forms of the 'be' verb in certain contextual positions where the sense of the clause can be understood without the 'be' verb.

ex: The student is taking too many courses.

BeVp: Identifies the entire non-lexical section of a verb phrase that involves a 'be' verb, where the verb phrase section is not essential to the meaning or to the grammatical integrity of the sentence.

ex: Doug must be willing to invest in the future.

BogusSubject: Identifies subjects that carry no content.

ex: The level increased because the knob kept moving forward.

CommentInit: Identifies initial sentence comments that are not marked as orienters.

ex: Pound for pound, Bill Bates is the hardest hitter in the league.

ComparativeInSubjComp: Identifies comparatives in subject complements that are not essential to the meaning or to the grammatical integrity of the sentence.

ex: These cars are faster than mine.

ComparativeInSubject: Identifies comparative expressions in the subject that are not essential because they do not contain significant content.

ex: The faster planes will leave last.

Compromiser: Identifies 'compromiser adverbs' that are not essential to the meaning, where the conjunction is not essential to the meaning or to the grammatical integrity of the sentence.

ex: Men both young and old were invited.

ConcessiveAdv: Identifies 'concessive adverbs' that are not orienters.

ConjInNp: Identifies conjunctive and adjunctive adverbs that start main clauses and which are not orienters.

ex: Additionally, we may have to spend more money.

CorrelConj: Identifies 'correlative conjunctions' with following prepositional phrases.

CryptoAdjClause: Identifies clauses that syntactically appear adjectival but grammatically function adverbially.

ex: It came from the French, which also . . .

CryptoAdv: Identifies syntactic adverbs that are not necessary to the meaning.

CryptoClause: Identifies clauses of any type that appear syntactically isolated. Identifies a syntactic subject that is grammatically an adverbial.

ex: Actually, a few days prior to the interview, they had . . .

CryptoPrepPhrase: Identifies prepositional phrases of time that are not part of verbs that are marked as obligatory or optional adverbials.

ex: We met on that day.

DemonsAdj: Identifies 'demonstrative adjectives' that do not carry strong content (marked weak in the lexicon).

DemonsSubjBe: Identifies 'demonstrative pronouns' that are the grammatical subject of 'be' verbs.

DemonstrativeModifier: Identifies demonstrative adjectives that do not carry strong content (marked weak in the lexicon).

DemonstrativeSubject: Identifies demonstrative pronoun subjects that are not necessary to the grammatical integrity of the sentence.

Determiner_d: Identifies determiners that modify only plural count nouns, and that are not essential to the meaning.

DoVerb: Identifies the 'do' verbs that are not negated and that are not essential to the meaning.

ex: The students did understand the lesson.

ElliptedPassive: Identifies emlipted passives clauses that are not essential to the meaning.

ex: The language supports several color spaces based on this standard.

EmptyVerb: Identifies verbs with an empty meaning, such as 'try, begin, ought', that are not essential to the meaning.

ex: He tries to maintain a good balance.

ExtractTopicWord: Returns the actual word from the initial sentence that represents the topic of the sentence.

Factive: Identifies 'noun particles' that are measurements, such as 'gallon, piece, few' that are not essential to the meaning.

ex: He added several gallons of water.

FinalPrep: Identifies prepositions that occur at the end of the sentence.

ex:

FindTopic: Identifies the main thematic topic in the sentence.

ex: A list of employees was printed.

The judge ruled that they were innocent.

FocusAdv: Identifies 'focusing adverbs' that are not orienting words.

HaveAux: Identifies the 'have' verb where it is not essential to the meaning or to the grammatical integrity of the sentence.

ex: The students have learned their lesson.

HaveTo: Identifies the phrasal forms of 'have+to' when functioning as a full lexical verb. This sequence would be replaceable by single words, such as 'must'.

ex: We have to leave soon.

HedgingWd: Identifies 'hedging' words, such as 'partially' that do not carry strong content.

ex: He was partially finished with the job.

HedgingVerb: Identifies hedging verbs whose subject is plural with a following infinitive.

InfinClauseAfterObj: Identifies infinitive clauses that follow direct objects. The clause if tagged if it contains no strong elements.

ex: We completed all the forms to get a passport.

InfinInfin: Identifies a series of two infinitive phrases where the first is not necessary to the meaning or to the grammatical integrity of the sentence.

ex: We needed to finish to get our diploma.

IsAdjOrAdvClause: Identifies the given word as part of any adverbial or adjectival subordinate clause.

IsAnotherFocus: Returns TRUE when another main focus occurs in the current predicate after the given word location.

IsAnnouncement: Identifies the current verb as a verb of 'announcement'.

ex: We announced that the acquisition was called off.

IsAdjAdvClauseAnywhere: Identifies that the given word is contained in an adverbial or adjectival subordinate clause at ANY level of subordination.

IsAntecedantPrnSubj: Identifies the given pronoun subject as having an antecedent in the current sentence.

ex: Bob said that he would be there later.

IsAsBlankAs: Identifies the given word as part of an 'as WORD as' sequence.

ex: He is as clever as a fox.

IsAuxVerb: Identifies the given word as an auxiliary verb.

ex: He can see the painting.

IsBackRefCompoundNp: Identifies the given conjunction as part of a noun phrase compound where the second element is referring back to previous information.

IsBeComplement: Identifies the given word as a topic in a subject complement.

IsBeEquate: Identifies the given word as a 'be' verb for a coordinated topic.

IsBogusMc: Identifies the given word as an appositive that is syntactically marked as a main clause. ex: He pleaded guilty to embezzling from a bank, and to tax evasion, acts committed before he was married.

IsBogusSubject: Identifies the given word as a gerund syntactically marked as a subject.

ex: An exercise machine employing this cam enables the user to produce remarkable growth in strength and muscle size.

IsCompAppositive: Identifies the given word as an appositive that is properly ended.

ex: Bob Smith, a market analyst, said . . .

IsComplexPrep: Identifies the given word as the preposition starting a complex prepositional phrase.

IsCompoundNp: Identifies the given word as part of a compound noun phrase.

ex: Bob caught a tuna and a bass.

IsCryptoNoun: Identifies the given word as an adverb that is syntactically functioning like a noun.

IsDefArtThisNp: Identifies the given word as part of a noun phrase that contains a definite article.

ex: The three bears lived in the woods.

IsDeleteableNounClause: Identifies the given word as part of a noun clause that does not contain strong information.

ex: A general link will find the general area of the document on which the mouse was clicked.

IsDitransNeedPp: Identifies the given word as a prepositional phrase that belongs to a ditransitive verb.

ex: The state declared the land as one of its natural resources.

IsElliptedPassiveClause: Identifies the given word as part of an ellipted passive construction.

ex: These are device independent programs based on the new standard.

IsEndOfClause: Identifies the given word as occurring at the end of any clause structure.

ex: After the game was over, we left for the party.

IsEndOfMc: Identifies the given word as occurring at the end of a main clause.

ex: The bear walked through the woods; Bob never heard it coming.

IsEveryWordToLeftDeleted: Identifies that every word to the left of the given word in the sentence has been marked as non-sential.

IsGoodNounThisPp: Returns TRUE when the given word is in a prepositional phrase that contains a strong or supported noun.

ex: A list of new employees was printed.

IsEmbeddedClause: Identifies the given word as part of a subordinate clause that is embedded in another subordinate clause.

ex: Bob said that the list that was printed was incomplete.

IsImperative: Identifies the given word as an imperative verb.

ex: Write your name on the first line.

IsInNp: Identifies the given word as part of a valid noun phrase.

ex: The bear walked through the woods.

IsInfinitive: Identifies the given word as an infinitive verb.

ex: Bob is going to give me the lamp.

IsInfinitiveClause: Identifies the given word as part of an infinitive clause.

ex: Bob is going to give me the lamp.

IsMainVerb: Identifies the given word as the main lexical verb of a verb phrase.

ex: The ship can usually be identified by its name.

IsModifierSpeechAct: Identifies the given word as a noun that is being modified by a speech act word.

ex: Chapter one is an overview . . .

IsNeededAdjClause: Identifies that the given word is part of an adjectival clause that IS essential to the sentence. The clause is essential when the noun it modifies is weak and needs support, and then the adjectival clause has strong elements.

ex: The person who rang the bell was never found.

IsNegAdvCl: Identifies the given word as part of a subordinate clause that is being negated (a negative word appears in the clause).

ex: When I couldn't jump the ditch they left me behind.

IsNegVerbThisPred: Identifies the given word as part of a predicate that contains a negative verb.

ex: Bob did not hear the bear.

IsNotPartOfSpeech: Identifies the given word as syntactically ambiguous.

IsNounThisDo: Identifies the given word as part of a direct object with a noun head.

ex: Bob heard the bear in the woods.

IsOkAdj: Identifies the given word as an adjective that carries strong thematic content for supporting a noun.

ex: The economic summit was a success.

IsOkCompHead: Identifies the given word as the head word of a subject complement.

IsOneWordClause: Identifies the given word as a subordinate clause with only one word.

ex: The man accused was very nervous.

IsOnlyPossibleTheme: Identifies the given word as the only strong theme in the sentence.

ex: The bear didn't hear me approaching.

IsSubjectVerbMatch: Identifies that the two given word locations agree in number. This is valid only for simple number tests.

ex: The man with the pictures runs my business.

IsNeededPp: Identifies prepositional phrases that are attached to verbs and that are necessary for the proper thematic completion of the verb.

ex: He put the book on the table.

IsOfPpNeeded: Identifies possessive prepositional phrases that modify weak noun heads, where the prepositional phrase is necessary to the thematic completion of the main noun.

IsOkTheme: Identifies a particular word as being a valid thematic topic. A noun phrase that is strong or that has strong support in its modifying elements.

IsPassiveVbThisPred: Identifies the main verb phrases of the currently pointed to predicate, and returns TRUE when the verb phrase is a passive verb phrase.

ex: We were expected at the office.

IsPassiveVp: Identifies the current word position as being in a passive verb phrase.

ex: We were usually expected at the office.

IsPluralSubjectOfVerb: Identifies the subject of the verb currently being pointed to, and returns TRUE if this subject is plural.

ex: The boys who were at the store jumped into the car.

IsPosAppositive: Identifies the current word being pointed to as being an appositive for the previous noun phrase.

IsPosMainTopic: Identifies the current word being pointed to as being able to function as the main topic of the sentence. It must be strong or have strong support.

IsPrepPhrase: Identifies the current word being pointed to as part of a prepositional phrase.

ex: The rest of the group were hidden in the back of the house.

IsPreviousAs: Identifies when the current word being pointed to is part of an 'as' subordinate clause.

ex: We need to implement the new plan now, as the old plan cannot be completed on time.

IsPreviousComparative: Identifies when the current word being pointed to is part of a comparative phrase in the predicate of the sentence.

IsPrevAuxNeg: Identifies if the current word being pointed to is a verb in a verb phrase that carries a negative modal verb.

ex: He could not usually talk that long.

IsReducedSubClause: Identifies that the current word being pointed to is part of a reduced subordinate clause.

ex: The bear walking in the woods is very noisy.

IsSameBaseClause: Identifies that the two words being pointed to are part of the same base clause.

IsSameClause: Identifies that the two words being pointed to are part of the same clause.

IsSameNounConstituent: Identifies that the two words being pointed to are part of the same noun constituent.

IsSamePp: Identifies that the two words being pointed to are part of the same prepositional phrase.

IsSectionHeading: Identifies the current sentence as being a heading only, not a complete grammatical sentence.

ex: Formatting New Sections

IsStartMc: Identifies the current word being pointed to as the first word of a main clause.

ex: The bear walked through the woods; Bob could not hear it.

IsSubjDeleted: Identifies that the subject for the clause that is being pointed to has been marked as not being essential to the meaning or to the grammatical integrity of the sentence.

ex: The list was not printed using the laser printer.

IsThereMainAction: Identifies that there is a main clause action in the sentence that has not been marked as weak or unnecessary.

ex: The bear walked through the woods.

IsThereMainFocus: Identifies that there is a main focus in the sentence.

ex: The employee master list was printed with a laser printer.

IsThereMainTopic: Identifies that there is a main topic in the sentence.

ex: The list was printed with a laser printer.

IsThereNcTopic: Identifies that the main topic of the sentence is being expressed by a noun clause.

ex: What the speaker said didn't make much sense.

IsTherePrevDo: Identifies that there is a direct object in the current predicate that occurs prior to the current position being pointed to.

ex: We heard the bear walking though the woods.

IsTherePrevPrepFrom: Identifies a prepositional phrase in the same basic thematic unit that is a 'from' type prepositional phrase.

IsThereSupport: Identifies that the current noun being pointed to has strong modifying information.

ex: An economic decision is best.

IsThereWeakTopic: Identifies that the current word being pointed to is a weak, but usable, topic.

ex: The decision was made.

IsTrueAdj: Identifies that the current word being pointed to is a true adjective, not a participle.

ex: The linguistic program at the college was canceled.

IsTrueNp: Identifies that the current word being pointed to is part of a valid noun phrase.

ex: The linguistic program at the college was canceled.

IsThemePh: Identifies that the prepositional phrase being pointed to is part of the main theme of the sentence.

ex: The list of employees was printed on a laser printer.

IsType1Quote: Identifies quoted material with the format–subject+comma+speech act verb+noun phrase+comma+predicate:

ex: But the action, said London financial analyst Bob Smith, was . . .

IsType2Quote: Identifies quoted material with the format–subject+comma+noun+prepositional phrase+comma+speed act+noun clause:

ex: Bob Smith, president of the company, said that the system . . .

IsType3Quote: Identifies quoted material with the format–main clause with no object+comma+noun phrase+speech act:

ex: The yield dropped substantially, market watchers said.

IsType4Quote: Identifies quoted material with the format–main clause with object+comma+noun phrase+speech act ex: Commercial banks will reduce the prime rate, analysts said.

IsType5Quote: Identifies quoted material with the format–subject+verb+to+speec act+noun clause:

ex: He declined to say whether the paper was accepted or not.

IsType6Quote: Identifies quoted material with the format–subject+speech act+comma+quoted clause:

ex: She said, "We will probably buy it."

IsType7Quote: Identifies quoted material with the format–subject+comma+noun+prepositional phrase+comma+speec act+comma+quoted noun clause:

ex: Bob Smith, son of Joe, said, "I don't care."

IsType9Quote: Identifies quoted material with the format–subject+speech act+object+noun clause:

ex: The lady told the customers that they were out of peanuts.

IsType10Quote: Identifies quoted material with the following format:

ex: "I don't care who shot the cat," Josh said.

IsType11Quote: Identifies quoted material with the format–quoted main clause with comma+subject+speech act+comma:

ex: "We can do it," he said, and added that it would be difficult.

IsVerbThisClause: Returns RUE when there is a lexical verb in the clause pointed to.

IsWeakCompoundNp: Identifies weak compound noun phrases.

ex: The line and the list were not long enough.

IsWeakPp: Identifies that the current word being pointed to is in a weak prepositional phrase.

ex: The name on the list was mine.

IsWhatTense: Returns the verb tense for the word being pointed to. Only 'past' and 'present' are valid.

IsProgressiveVp: Identifies the current word being pointed to as a progressive verb phrase.

IsRepeatTopic: Identifies a particular topic as one that has been established in the discourse recently.

ex: The bear was running through the woods. It stopped at a small pond and started to drink. Then the bear raised its head and started sniffing.

IsTooWeakThemeWord: Identifies a given word as one that is too weak to be a topic of the sentence.

ex: The list was printed on the laser printer.

LowAdverbialClauses: Identifies low priority adverbial clauses that are not necessary to the meaning.

MannerAdverb: Identifies 'manner adverbs' that are not essential to the meaning or to the grammatical integrity of the sentence.

ex: He wrote the letter awkwardly.

McIntroConj: Identifies conjunctions starting main clauses where the conjunction is not essential to the meaning or to the grammatical integrity of the sentence. The conjunction would be replaced with a semicolon.

ex: The soldiers gave a great cheer, for he had won the victory.

Modal: Identifies 'modal auxiliary verbs' that are not essential to the meaning or to the grammatical integrity of the sentence.

ex: We shall arrive on time.

ModDetAdv: Identifies adverbs that modify determiners that are not negative.

MoreAdverbial: Identifies the adverb 'more' in contexts that are not essential to the meaning or to the grammatical integrity of the sentence. This usually indicates additional detail to follow that other theme routines would identify.

ex: Freud contributed more than anyone.

MoreThan: Identifies more . . . than constituents with than functioning as a preposition, with the prepositional phrase not essential to the meaning.

ex: It is more a fish than an animal.

NegativeAdj: Identifies negative adjectives that are not essential to the grammatical integrity of the sentence.

ex: Neither student failed.

NegativePrnSubj: Identifies negative pronoun subjects modified by possessive prepositional phrases.

ex: Neither of the accusations was true.

NeuterProSubj: Identifies 'neuter pronoun subjects' such as 'it, there', that are not essential to the meaning or to the grammatical integrity of the sentence.

ex: It ran into the woods.

NonRestrictiveRel: Identifies syntactic prepositional phrases that are grammatically relative clauses.

ex: Certain buildings such as the RCA building will be destroyed.

NounTimeAdverbial: Identifies noun time adverbials that are not essential to the grammatical integrity of the sentence.

ex: Ed signaled Thursday that he's tired.

ObjectAfterPp: Identifies syntactic direct objects that follow prepositional phrases, which are grammatically appositives or reduced clauses and not essential to the grammatical integrity of the sentence. ex: The stock closed at 5 ½, a gain of ⅛.

OfInNp: Identifies the 'of' preposition as head of a prepositional phrase that, along with a weak noun it may modify, is not essential to the meaning or to the grammatical integrity of the sentence.

ex: One of the dogs

OneAdj: Identifies where 'one', when used as an adjective, is not essential to the meaning.

ex: We saw one bear running through the woods.

OnBeforeTime: Identifies where 'on', when used before 'time' words, is not essential to the meaning.

ex: The party was held at the office on Tuesday.

OrphanAdjectivalClause: Identifies adjectival clauses whose noun head modifiers have been identified as not essential to the meaning or to the grammatical structure of the sentence.

PossProObj: Identifies possessive pronouns in prepositional phrases or objects, where the pronoun is not essential to the meaning or to the grammatical integrity of the sentence.

PossProSubj: Identifies possessive pronouns in subjects, where the pronoun is not essential to the meaning.

PreDetNp: Identifies 'predeterminers' such as 'just' that are not essential to the meaning.

ex: Bob thought that just three files were missing.

PrepPhrases: Identifies prepositional phrases that are not essential to the meaning or to the grammatical integrity of the sentence.

PrepPrep: Identifies a preposition followed by another preposition where the second preposition is not essential to the meaning or to the grammatical integrity of the sentence.

ex: The cat is by the heater in the kitchen.

PronounSubjPassive: Identifies 3rd person pronoun subjects with passive verb phrases.

ex: She was sent to the store by Bob.

PseudoMcBreak: Identifies 'in that' clauses where 'in that' could be replaced by punctuation.

ex: We agreed with Bob, in that he was the expert.

PureCoordConj: Identifies 'pure coordinating conjunctions' that could be replaced by commas or other punctuation.

Bob saw the bear, and the bear ran away.

QuoteSource: Identifies the quoted source of statements. Refer to the individual IsQuote... theme routines for detail.

ReflexivePrn: Identifies 'reflexive pronouns' that are not essential to the meaning or to the grammatical integrity of the sentence.

RelThat: Identifies 'relative pronouns' that introduce relative clauses, where the pronoun is not essential to the grammatical integrity of the sentence.

SaveTopic: Identifies every word in the sentence that is not part of the main topic.

ex: The bear ran through the woods.

Semicolons: Identifies main clause boundaries where conjunctions could be replaced with punctuation.

ex: The bear ran through the woods, and Bob ran home.

StrandedInfinClause: Identifies syntactic infinitive clauses that are not essential to the meaning or to the grammatical integrity of the sentence.

StrandedNounClause: Identifies noun clauses that are not essential to the meaning or to the grammatical integrity of the sentence.

StrandedNounPhrase: Identifies temporal noun phrases that are not essential to the meaning or to the grammatical integrity of the sentence.

ex: The tiger at the circus performs twice a day.

StrayAdj: Identifies adjectives not in noun phrases or subject complements.

StrayAdverbial: Identifies adverbials that are not in traditional grammatical locations.

SubjAdvVerb: Identifies adverbs positioned between the subject and verb of a clause, where the adverb is not an orienter.

ex: Bob quickly ran away from the bear.

SubjectSplice: Identifies subordinate clause subjects that are acting as the subject of the main clause.

ex: As the term is used again in the same section of text, it loses importance.

SweepNpTrash: Identifies noun phrases that appear stranded after the surrounding context has been identified as non essential.

ThanPrepPhrase: Identifies prepositional phrases beginning with 'than' that are not essential to the meaning.

ex: It is more a fish than an animal.

ThatClauseAdj: Identifies adjectives in 'that' clauses with weak verbs, where the entire clause is not essential to the meaning or to the grammatical integrity of the sentence.

ex: Be aware that similar products often come with different labels.

TimeAdj: Identifies 'adjectives or adverbs of time' that are not essential to the meaning.

ex: Bob walked to the store daily.

TimeAdvInVp: Identifies time adverbs in verb phrases.

ex: Bob walked daily to the store.

TimeInObject: Identifies time noun phrases in objects.

ex: Bob went to Rome each Christmas.

TimeInSubjNp: Identifies time noun phrases in the subject of the sentence.

ex: Every Thursday is a hard day for Bob.

TimeSubject: Identifies simple time subjects, with following subject modifiers, where the time subject can be replaced with the following modifiers.

ex:

TimeTime: Identifies time words that follow other time words, where the second time word is not essential to the meaning.

ToInfinitive: Identifies infinitives marked by 'to' where the 'to' is not essential to the grammatical integrity of the sentence.

ToneAdv: Identifies 'tone adverbs' indicated as 'maximizers, emphasizers or diminishers' that are not essential to the meaning.

TopicalizerPhrase: Identifies topicalizers modifying before possessive prepositional phrases where the topicalizer and the following preposition are not necessary to the meaning or to the grammatical integrity of the sentence.

TopicalClause: Identifies introductions to topical clauses.

ex: It is dynamic in that it can provide feedback.

Transition: Identifies 'transition words' that do not indicate 'time' or 'coordination', and that are not essential to the meaning or to the grammatical integrity of the sentence.

TrashBogusMc: Identifies clauses begun with semicolons where there is not a full main clause and where the clause is not essential to the meaning or to the grammatical integrity of the sentence.

TrashMc: Identifies main clauses that have all of their major elements marked as non-essential to the meaning and to the grammatical integrity of the sentence, where the entire main clause is actually unnecessary.

TrashStraySubj: Identifies subjects that have become unattached because of insufficient strong information in the rest of the clause.

TrashWholeSent: Identifies entire sentences that don't have any strong thematic content.

UniversalPrn: Identifies 'universal pronouns', 'predeterminers' or 'cardinal determiners' that are not essential to the meaning or to the grammatical integrity of the sentence.

UselessAdj: Identifies weak adjectives in noun phrases.

ex: The late president planted that tree.

UselessPrepPhrase: Identifies meaningless prepositional phrases.

ex: There is a viable alternative to it.

UselessPrnObj: Identifies indirect object pronouns.

ex: Congress gave them the shaft.

UselessPrnSubj: Identifies pronoun subjects that have alternate subject contexts that carry the meaning.

ex: No one except his supporters agree with the senator.

VerbAtEnd: Identifies verbs at the end of subordinate clauses, where the verb is not essential to the meaning or to the grammatical integrity of the sentence.

VerbInit: Identifies initial comment verbs.

ex: Note, however, that the apples were all green.

WeakAdj: Identifies weak adjectives.

ex: The simple solution is to not go.

WeakEquation: Identifies non-negative be-verb clauses that are equating only weak thematic information.

ex: The list was quite large.

WeakPrepPhrase: Identifies weak prepositional phrases.

ex: I would like to know your opinion as to your boss's behavior.

WeakPrepSeq: Identifies a sequence of prepositional phrases that are collectively weak in thematic content.

ex: It was built on the basis of my invention.

WeakSubjComp: Identifies weak subject complements that have extended contexts.

ex: The motivation for the research was the issue of how to teach pronunciation.

WhAdjClause: Identifies wh-element adjectival clauses that modify strong nouns or that do not carry supporting information.

ex: Boredom is especially trying for young people who have so few opportunities.

WhElement: Identifies wh-element clauses.

WhNounClause: Identifies noun clauses that are not essential to the grammatical integrity of the sentence.

ex: A model for the scientific investigation of language arose which took its problems almost exclusively from British sources.

Wordy: Identifies wordy expressions and single word replacements.

WhileSubordinators: Identifies 'time-indicating' subordinating conjunctions, such as 'while', that are not essential to the meaning or that could be replaced with punctuation.

ex: Please get me some flour while you are at the store.

Theme-Relational Tagging

Themerelational tagging looks for certain grammatical or thematic relationships and follows a particular line of processing which tags all of the words from a specifically identified start point to a specifically identified end point. There are approximately 15 of these routines.

DelAllAux: Flags each auxiliary verb in each verb phrase.

ex: Bob can leave as soon as he is cleared of the charges.

DelAllButNp: Flags each word in the sentence that is not in the current noun phrase being pointed to.

DelClause: Flags each word in the clause (and imbedded clauses) being identified by the given word.

DelCurrPp: Flags each word in the prepositional phrase being pointed to.

DelDo: Flags each word in the direct object being pointed to.

DelLogicBreak: Flags each word in the same logical constituent group indicated by the given word.

DelMc: Flags each word in the main clause being pointed to.

DelObj: Identifies any word in an object being identified by the given word.

DelPp: Flags each prepositional phrase that is not essential to the meaning or to the grammatical integrity of the sentence.

DelRemainderSubj: Flags each word to the right of the current word that is part of the complete subject of the current clause.

DelStraySubj: Flags each word of the complete subject being pointed to when the subject is not essential to the meaning of the sentence.

DelToTheLeft: Flags each word to the left of the given word.

DelToTheRight: Flags each word to the right of the given word.

DelVerb: Flags the current word being pointed to if it is a verb.

DelVp: Flags all words if the verb phrase being pointed to.

Theme-Location Identification

Theme location identification searches for particular grammatical or thematic relationships and returns a location of where this word, phrase or cause starts in a sentence. There are approximately 35 of these routines.

FindIoThisPred: Returns the location of an indirect object in an identified predicate.

FindAllPp: Returns the location of a prepositional phrase where the last word of a string of phrases is needed to support any part of the prepositional phrase string from the beginning.

FindClauseType: Returns the type of subordinate clause at the given location.

FindClauseLevel: Returns the number of subordinate clause levels at the given location.

FindEndNp: Returns the location of the end of the given noun phrase.

FindEndLogicBreak. Returns the location of the end of the logical constituent group being pointed to.

FindEndObj: Returns the location of the end of the object being pointed to.

FindEndPp: Returns the location of the noun head of the prepositional phrase being pointed to.

FindEndSubj: Returns the location of the end of the complete subject being pointed to.

FindEndSc: Returns the location of the end of the subject complement being pointed to.

FindEndSubClause: Returns the location of the end of the subordinate clause being pointed to.

FindEndVp: Returns the location of the end of the verb phrase being pointed to.

FindLastNounInNp: Returns the location of the last noun head of the series of noun phrases identified by the given word.

FindLastVerbInVp: Returns the location of the last verb in the series of verb phrases identified by the given word.

FindNextMc: Returns the location of the start of the next main clause after the given word.

FindNextNoun: Returns the location of the next strong noun after the given word.

FindNextFirstNoun: Returns the location of the next noun after the given word.

FindNextKeptWd: Returns the location of the next word after the given word, where the word has not been marked as non-essential.

FindNounForThisAdj: Returns the location of the noun that the current adjective being pointed to modifies.

FindNounForThisPp: Returns the location of the noun head for the prepositional phrase being pointed to.

FindObject: Returns the location of the next object after the given word.

FindPrevNoun: Returns the location of the last noun before the current given word.

FindPrevNounVerb: Returns the location of the last noun or verb before the current given word.

FindPrepPrep: Returns the location of the last preposition before the current given word.

FindStartNp: Returns the location of the start of the noun phrase being pointed to.

FindPseudoVerbThisPred: Returns the location of the next participle in the predicate being pointed to.

FindStartMc: Returns the location of the start of the main clause being pointed to.

FindStartPp: Returns the location of the start of the prepositional phrase being pointed to.

FindStartSubClause: Returns the location of the start of the subordinate clause being pointed to.

FindStartVp: Returns the location of the start of the verb phrase being pointed to.

FindSubjThisPred: Returns the location of the simple subject after the current given word.

FindUndeletedWrd: Returns the location of the next word before the current given location that is not marked as nonessential to the meaning.

FindVerbThisPred: Returns the location of the first verb of the verb phrase for the current predicate being pointed to.

FindVerbThisSubj: Returns the location of the first verb of the verb phrase for the subject being pointed to.

Each of these assessments has its results stored for each word in the thematic context output area. Any application is now able to take advantage of this information, as well as the grammatical and stylistic information stored previously, to make intelligent observations about the grammar, theme and style of the text, and to perform some helpful operation against it, such as summarizing or outlining the text Sample Code The following sample code shows how several typical theme tagging routines work. The theme parser works by setting a generalization of what each routine is looking for. followed by specific contexts that can either exclude certain sentences from the tagging or specifically include them.

```
PersonalRef(word_ctr)
ub1 word_ctr;
{
int vbos;
int endvp;
int endnp;
int ctr;
if (LEX(wd_personal_prn,word_ctr) &&
LEX(wd_first_person_prn,word_ctr) &&
verb_phrase[word_ctr+1] &&
simple_subject|word_ctr] &&
!subordinate_clause[word_ctr])
***The above section tests that the current word being pointed to by
word_ctr is a first-person, personal pronoun, functioning as
the subject of the clause, followed by a verb phrase. The clause must
be a main clause, not a subordinate clause. If these tests pass, the
routine continues, otherwise it returns. This test is the first general
test to determine if a word is a personal reference type. It is
followed by secondary tests that constrain this generalization in certain
contextual conditions. Note in this sample routine that the constraints
are fairly specific and if met return without doing any tagging. If the
reference noun in question does not have these constraints, then it is
flagged by default.***
{
vbpos = FinfLastVerbInVp(word_ctr+1); ***this locates the last
verb in the verb phrase following the word after the current pronoun***
if (IsNegVerbThisPred(vbpos) | |
prep[vbpos+1]) ***this checks the verb phrase for a negative element
anywhere in it, or for a preposition immediately following the last verb
in the verb phrase***
{
return 0;***return when negative verb phrases encountered: We
CANNOT foresee any insurmountable problems.***
}
ctr = vbpos+1;***position to next word following the end of the
verb phrase
if (prn[ctr])
{
return 0;***return if a pronoun follows the verb phrase: I saw HIM the
following weekend.***
}
while (ctr < number_words-3 &&
predicate[ctr] &&
IsSameClause(vbpos,ctr))
{
if (conj[ctr]) &&
IsWordCoordConj(ctr) &&
ctr < number_words-2 &&
verb[ctr+1])
{
vbpos = FindLastVerbInVp(ctr+1);
if (IsNegVerbThisPred(vpos))
{
return 0;***Return when the predicate extends with the context of a
coordinating conjunction followed by a verb phrase, and where the
verb phrase contains a negative element.***
}
break;
}
ctr++;
}
if (LEX(wd_that_clause_verb,vbpos) | |
LEX(wd_emotion_attitude,vbpos))
```

37
-continued

```
{
if (LEX(wd_factual_know_verb,vbpos))
{
if (!(LEX(wd_speech_act,vbpos) &&
LEX(wd_that_clause_verb,vbpos)))
{
return 0;***Checks the last verb in the verb phrase for being either
a that-clause verb (say, expect, see . . .) or a verb of emotion or attitude
(disappoint, amazed), and where the verb is a factual knowledge verb, but
not a speech act verb AND a that-clause verb. Verbs will be those such as
'hate,call . . .'***
}
}
if (IsWordQuoteVerb(vbpos) &&
vbpos < number_words-1 &&
!IsWordThat(vbpos+1))
{
return 0;***Returns when the verb position is a quotative verb, not
the last word of the sentence, and where the following word is NOT
abstractly identified by the lexical flags set on 'that'. I
will WRITE as soon as I can.***
}
endvp = FindEndVp(vbpos);
if (endvp < number_words-1 &&
IsInfinitiveClause(endvp+1))
{
return 0;***Returns when the end of the verb phrase (includes
adverbs) is followed by an infinitive clause.***
}
if (prn[endvp+1] &&
!LEX(wd_nominative_case_prn,endvp+1))
{
endvp++;*Positions pointer to a subjective case pronoun*
}
if (!noun_phrase[endvp+1] &&
!conj[endvp+1]))
{
return 0;***Returns if the following word is not in a noun phrase and
not a conjunction.***
}
if (noun_phrase[endvp+1])
{
endnp = FindEndNp(endvp+1);
if (!(conj[endnp+1] &&
IsWordTo(endnp+1)))
{
return 0;***Returns when the following word in a noun phrase, and
when the next word after the end of the noun phrase is not the an
infinitive clause (identified by the abstract features of the word
'to' tagged in a conjunction position, which signals the
subordination in the parser).
}
}
for (;word_ctr <= endvp; word_ctr++)
{
ThemeTag[word_ctr][PersonalRefCode] = TRUE;
***Tags all of the words from word_ctr through the end of the
verb phrase as a personal reference: I believe that through revenue growth
we will make that goal.***
}
if (IsWordThat(word_ctr))
{
ThemeTag[word_ctr][PersonalRefCode] = TRUE;
***Tags the word that if in the following position after the previous
tags.***
return 0;
}
else
{
word_ctr;*Sets position at last tagged word.*
}
}
}
}
AdverbNpInit(word_ctr)
int word_ctr;
{
int nounpos;
if (noun_phrase[word_ctr] &&
!subordinate_clause[word_ctr] &&
```

38
-continued

```
IsStartMc(word_ctr))
{
***The above code is the opening generalization that looks for a noun
phrase that is not in a subordinate clause, and that starts a new main
clause. This is the initial condition necessary for determining initial
noun phrase adverbials. The following code will add constraints for
particular contextual conditions. Notice that the constraints are fairly
general, and that with a few basic tests being passed, and a few NOT
conditions being met, the noun phrase will be tagged of this type.***
nounpos = FindLastNounInNP(word_ctr);***Find the last noun
in the noun phrase currently being pointed to from above.***
if (IsTimeNoun(nounpos) &&
!simple_subject[nounpos] &&
complete_subject[nounpos])
{
*** if the noun head is a time word, not the simple subject of the
clause, but is classified in the complete subject portion of the clause,
then it is tagged as being an introductory adverbial of time. ex:
Early next morning, before dawn, they fed the foxes.***
TagNp(nounpos);
}
}
}
UselessPrepPhrase(word_ctr)
int word_ctr;
{
int nounpos;
int envpp;
int vbpos;
int temp;
if (prep[word_ctr] && pp_adj[word_ctr])
{***Opening generalization is to allow all prepositional phrases that
are coded as adjectival types to be available for the useless prepositional
phrase tagging. The following code will apply constraints to this
generalization. Unlike the previous examples, this example does not return
based on the constraints as much as it only allows for the
prepositional tagging inside specific constraints.***
nounpos = FindNounForThisPp(word_ctr);***find the noun head for
the prepositional phrase.***
if (nounpos == NOT_FOUND)
{
return 0;***return if a valid noun head is not found for the
preposition.***
}
if (IsGoodNounThisPp(word_ctr))
{
return 0;***return of the noun head is listed as an important supporting
word for other phrases. It cannot be flagged as useless if this is so.***
}
endpp = FindEndPp(word_ctr);***Find the end of the prepositional
phrase (last word).***
if (endpp < number_words-1 && IsWordThan(endpp+1))
{
return 0;***If the following word has the abstract characteristics of 'than'
then return.***
}
if (predicate[word_ctr])
{
vbpos = FindVerbThisPred(word_ctr);
if (vbpos < number_words && IsDitransNeedPp(vbpos))
{
return 0;***If the word is in the predicate, and the main lexical verb
for the predicate is ditransitive, and is the type of word that needs
supporting prepositional information, then return. ex: The state
declared the land as one of its natural resources.***
}
}
if LEX(wd_personal_prn,nounpos) | |
IsWordDemonstrative(nounpos) | |
IsWordNeuterPrn(nounpos))
{***A second generalization is made above. This states that the
noun head identified earlier should be a personal pronoun, a
demonstrative pronoun, or a neuter gender pronoun to be considered
in this section.***
if (word_ctr > 0 &&
tag_table[word_ctr-1] != TAG_WD &&
(verb_phrase[word_ctr-1] | |
IsWordParticiple(word_ctr-1)))
{
return 0;***This constraint exits when the previous word has been tagged
```

-continued

```
by another routine as not high-priority and was either in a verb phrase or
a
participle. ex: She stood for a while looking at everything there
was to see.***
}
TagPp(word_ctr);***Now this prepositional phrase is tagged as
being weak (non-priority). ex: There is a viable alternative to it.***
}
}
if (word_ctr &&
prep[word_ctr] &&
pp_adv[word_ctr] &&
adj[word_ctr-1] &&
!apunc[word_ctr-1] &&
LEX(wd_comparative_adj,word_ctr-1))
{***This routine allows another generalization to attempt the
weak prep phrase tagging. If the word is a preposition and functioning
adverbially, and of the prior word is an adjective and is not followed
by any punctuation mark, and if the prior word is also a comparative
adjective, then the routine continues. ex: It is better for you than
for me.***
nounpos = FindNounForThisPp(word_ctr);
if (nounpos != NOT_FOUND &&
IsWordThan(nounpos+1) &&
!apunc[nounpos])
{***This constraint will allow for the weak prep phrase tagging.
If the noun head of the preposition is followed by the abstract nature
of the word 'than' and does not have any punctuation mark, then
the prep phrase is tagged as weak.***
TagPp(word_ctr);
}
}
}
```

USING THE THEME OUTPUT

There are three primary uses of the thematic information stored in the output section:

1. Kernel Sentence Generation
2. Topic Extraction
3. Content Extraction

Kernel Sentence Generation

A sentence can be said to have a main point, or kernel, that embodies the major pieces of information that the writer is communicating to the reader. The kernel is generally a subset of the sentence, with additional supporting detail mostly enforcing the main point. Much of the supporting information can be removed without detracting from either the logical truth of the sentence or the general understanding of the point being communicated. The grammar, style and theme of the sentence are used to make the determination of which words can be removed without violating either of the above guidelines. In addition, there is often not a single but a number of reductions that can be made, each moving towards the main kernel in small steps, the last step being the most tersely worded kernel sentence.

To generate these kernel sentences, certain thematic output settings will be checked, and certain low-content, grammatically neutral words removed. The correct thematic assessments are checked to give the desired kernel reduction level. Each of the following tags will be checked against each word in the sentence. Any word that has been thematically tagged with any of the assessments listed here will be removed from the sentence. The words that are left will form the new, reduced sentence.

Levels of Reduction

When a new sentence is generated, thematically-tagged functionality is removed, as opposed to reducing thematic aspects until a certain percent of the sentence remains. Four reduction levels are sufficient to represent summarized forms of sentences. Any more and the noticeable differences between levels becomes insignificant. The individual thematic contextual elements that are tested at each level should also be tested in the order given. If they are not, the reductions may vary. For example, some theme assessments look for 'stranded' clauses, where the prior word removals have caused a clause to be stranded from the main clause. In this case, it should be tested after most other tests, or it may be stranded after the test is made. Some of these routines are using the run-time theme assessments, since they cannot be tested in isolation. The four reduction levels are:

1. Contextual Reduction
2. Base Thematic Reduction
3. Secondary Thematic Reduction
4. Headline Thematic Reduction

Contextual Reduction

Contextual reduction is a different type of reduction from the three thematic reductions. Thematic reductions function hierarchically, with each reduction level having potentially more information removed than did the previous reduction level. The contextual reduction may be smaller or larger than any of the thematic reductions, depending on the writing style of the sentence. From the original sentence, the following thematic contextual elements are tested and, if present, the corresponding words are removed from the sentence in this reduction type.

QuoteSource
ThatClauseAdj
TopicalClause
TrashStraySubj
OrphanAdjectivalClause
CryptoAdjClause
PrepPhrases
CryptoPrepPhrase
ThanPrepPhrase
PrepPrep
UselessPrepPhrase
AdverbInit
OrphanPp
AdverbialBetweenCommas
WeakSubjComp
ElliptedPassive
Adverbs
TopicalizerPhrase
TimeObject
PossProSubj
AdjDeterminer_b
DemonstrativeSubject
WhElement
ComparativeInSubjComp
MoreThan
WeakAdj
AdvInNp
DemonstrativeModifier
AgoAdverbial
PersonalRef
BogusSubject
StrayAdj
TimeSubject
NonRestrictiveRel
PureCoordConj
Article
PossProObj
BeVerb
SubjAdvVerb
Modal
DoVerb
RelThat
AdverbAfterVerb NeuterProSubj
DemonsSubjBe
HaveAux
DemonsAdj
OneAdj
PreDetNp
OfInNp
ToInfinitive
ToneAdv
FocusAdv
AddAdv
Factive
HaveTo
HedgingWd
AttitudeAdv
ConcessiveAdv
OnBeforeTime
TimeAdj
ApproxPrep
ReflexivePrn
UniversalPrn
EmptyVerb
WhileSubordinator
TimeTime
Determine_d
AdverbSplitInfin
NounTimeAdverbial
AdjSubjComp
Compromiser
CorrelConj
McIntroConj
PronounSubjPassive
FinalPrep
MannerAdverb
ModDetAdv
ComparativeInSubject
AdverbEndMc
CryptoAdv
WeakPrepSeq
HedgingVerb
VerbInit
TimeInSubjNp
Wordy Base Thematic Reduction This is the first of three hierarchical reductions for a sentence. It is intended that the resulting new sentence is both grammatical and logically correct. It should also be relatively easy to read. The following thematic contextual elements in the original sentence are tested and, if present, the corresponding words removed from the sentence at this reduction level.

QuoteSource
ThatClauseAdj
TopicalClause
TrashStraySubj
AdvClauseInit
TrashBogusMc
Appositive
AdjectivalClause
AdverbialClause
CryptoAdverbialInit
AdverbialNpInit
CryptoAdjClause
StrayAdverbial
PseudoMcBreak
CommentInit
ObjectAfterPp
StrandedInfinClause
StrandedNounClause
StrandedNounPhrase
WeakEquation
SubjectSplice
PersonalRef
ThanPrepPhrase
BogusSubject
StrayAdj
AdverbInit
PrepPrep
TimeSubject
AdverbialBetweenCommas
NonRestrictiveRel
PureCoordConj
Artide
PossProObj
BeVerb
SubjAdvVerb
Modal
DoVerb
RelThat
AdverbAfterVerb
NeuterProSubj
DemonsSubjBe
HaveAux
DemonsAdj
OneAdj
PreDetnp
OfInNp
ToInfinitive
ToneAdv
FocusAdv
AddAdv
Transition
Factive
HaveTo
HedgingWd
AttitudeAdv
ConcessiveAdv
OnBeforeTime
TimeAdj
ApproxPrep
ReflexivePrn
UniversaPrn
EmptyVerb
WhileSubordinator
TimeTime
Detemiine_d
AdverbSplitInfin
NounTimeAdverbial
AdjSubjComp
Compromiser
OrphanPp
UselessprepPhrase
CorrelConj
McIntroConj
PronounSubjPassive
FinalPrep
MannerAdverb
ModDetAdv
ComparativeInSubject
AdverbEndMc
CryptoAdv
WeakPrepSeq
HedgingVerb
VerbInit TimeInSubjNp
Wordy
SweepNpTrash
VerbAtEnd
InfinInfin
TrashMc
Semicolons
TrashWholeSent
StrayAdj
StrayAdverbial
CorrelConj
Secondary Thematic Reducto This is the second of three hierarchical reductions for a sentence. It is intended that the resulting new sentence is both grammatical and logically correct. It removes additional information that begins to send the new sentence into a headline mode, but not quite as terse. The following thematic contextual elements in the original sentence are tested and, if present, the corresponding words removed from the sentence at this reduction level.

QuoteSource
    ThatClauseAdj
    TopicalClause
    TrashStraySubj
    AdvClauseInit
    TrashBogusMc
    Appositive
    AdjectivalClause
    AdverbialClause
    CryptoAdverbialInit
    AdverbialNpInit
    CryptoAdjClause
    StrayAdverbial
    PseudoMcBreak
    CommentInit
    ObjectAfterPp
    StrandedInfinClause
    StrandedNounClause
    StrandedNounPhrase
    WeakEquation
    SubjectSplice
    AdjAdvSubordination
    PrepPhrases
    WeakSubjComp
    ElliptedPassive
    Adverbs
    InfinClauseAfterObj
    TopicalizerPhrase
    TimeInObject
    PossProSubj
    AdjDeterminer_b
    DemonstrativeSubject
    CryptoClause
    WhElement
    ComparativeInSubjComp
    MoreThan
    AdjectivalPrepPhrase
    WeakAdj
    AdvInNp
    DemonstrativeModifier
    AgoAdverbial
    CryptoPrepPhrase
    AdjectiveNotDet
    PersonalRef
    ThanPrepPhrase
    BogusSubject
    StrayAdj
    AdverbInit
    PrepPrep
    TimeSubject
    AdverbialBetweenCommas
    NonRestrictiveRel
    PureCoordConj
    Article
    PossProObj
    BeVerb
    SubjAdvVerb
    Modal
    DoVerb
    RelThat
    AdverbAfterVerb
    NeuterProSubj
    DemonsSubjBe
    HaveAux
    DemonsAdj
    OneAdj
    PreDetNp
    OfInNp
    ToInfinitive
    ToneAdv
    FocusAdv
    AddAdv
    Transition
    Factive
    HaveTo
    HedgingWd
    AttitudeAdv
    ConcessiveAdv
    OnBeforeTime
    TimeAdj
    ApproxPrep
    ReflexivePrn
    UniversalPrn
    EmptyVerb
    WhileSubordinator
    TimeTime
    Determiner_d
    AdverbSplitInfin
    NounTimeAdverbial
    AdjSubjComp
    Compromiser
    OrphanPp
    UselessPrepPhrase
    CorrelConj
    McIntroConj
    PronounSubjPassive
    FinalPrep
    MannerAdverb
    ModDetAdv
    ComparativeInSubject
    AdverbEndMc
    CryptoAdv
    WeakPrepSeq
    HedgingVerb
    VerbInit
    TimeInSubjNp
    Wordy
    SweepNpTrash
    VerbAtEnd
    InfinInfin
    TrashMc
    Semicolons
    TrashWholeSent
    StrayAdj StrayAdverbial
CorrelConj

Headline Thematic Reduction

This is the last of three hierarchical reductions for a sentence. The new sentence is now reduced to a headlne-style sentence, that is not necessarily grammatical nor logically correct. The following thematic contextual elements in the original sentence are tested and, if present, the corresponding words removed from the sentence at this reduction level.

QuoteSource
ThatClauseAdj
TopicalClause
TrashStraySubj
AdvClauseInit
TrashBogusMc
Appositive
AdjectivalClause
AdverbialClause
CryptoAdverbialInit
AdverbialNpInit
CryptoAdjClause
StrayAdverbial
PseudoMcBreak
CommentInit
ObjectAfterPp
StrandedInfinClause
StrandedNounClause
StrandedNounPhrase
WeakEquation
SubjectSplice
AdjAdvSubordination
PrepPhrases
WeakSubjComp
ElliptedPassive
Adverbs
InfinClauseAfterObj
TopicalizerPhrase
TimeInObject
PossProSubj
AdjDetenminer_b
DemonstrativeSubject
CryptoClause
WhElement
ComparativeInSubjComp
MoreThan
AdjectivalPrepPhrase
WeakAdj
AdvInNp
DemonstrativeModifier
AgoAdverbial
CryptoPrepPhrase
AdjectiveNotDet
PersonalRef
ThanPrepPhrase
BogusSubject
StrayAdj
AdverbInit
PrepPrep
TimeSubject
AdverbialBetweenCommas
NonRestrictiveRel
PureCoordConj
Article
PossProObj
BeVerb
SubjAdvVerb
Modal
DoVerb
RelThat
AdverbAfterVerb
NeuterProSubj
DemonsSubjBe
HaveAux
DemonsAdj
OneAdj
PreDetNp
OfInNp
ToInfinitive
ToneAdv
FocusAdv
AddAdv
Transition
Factive
HaveTo
HedgingWd
AttitudeAdv
ConcessiveAdv
OnBeforeTime
TimeAdj
ApproxPrep
ReflexivePrn
UniversalPrn
EmptyVerb
WhileSubordinator
TimeTime
Determiner_d
AdverbSplitInfin
NounTimeAdverbial
AdjSubjComp
Compromiser
OrphanPp
UselessPrepPhrase
CorrelConj
McIntroConj
PronounSubjPassive
FinalPrep
MannerAdverb
ModDetAdv
ComparativeInSubject
AdverbEndMc
CryptoAdv
WeakPrepSeq
HedgingVerb
VerbInit
TimeInSubjNp
Wordy
SweepNpTrash
VerbAtEnd
InfinInfin
TrashMc
Semicolons
TrashWholeSent
LowAdverbialClauses
WeakPrepPhrase
NegativePrnSubj
WhNounClause
BeVp
NegativeAdj
WhAdjClause
MoreAdverbial
SweepNpTrash
UselessAdj
OrphanAdv UselessPrnSubject
UselessPrnObj
TimeAdvInVp
StrayAdverbial As a final stage of processing in the kernel generation section, the punctuation for the sentence is rewritten in order to best reflect the new sentence structure.

Topic Extraction

After the new kernel sentences have been generated, five topic extraction routines will be generated. They locate the main, new topic in the sentence, extract its supporting context, and place the result in one or more of the five topic extraction areas. The five topic extraction areas are:

1. Main Thematic Topic Group
2. Main Thematic Topic
3. Secondary Thematic Topic
4. Main Developed Topic
5. Main Proximity-Developed Topic Main Thematic Topic Group This topic extraction routine looks for the main topic in the sentence, along with its most important supporting context. If the main topic has already been developed, it looks for a secondary topic. If there is not a suitable secondary topic, or if the secondary topic has also already been developed, then the original main topic is selected. There are three processing phases used in establishing the main topic. First, certain thematic assessments are checked, and any associated words removed if they contain the tested assessments. These tests are:

QuoteSource
ThatClauseAdj
TopicalClause
AdverbInit
CommentInit
Appositive
WeakSubjComp Second, the main topic is extracted from the sentence elements that remain after the previous reductions:

SaveTopic

Last, contextual elements of specific types are removed from the main topic:

PrepPrep
PrepPhrases
UselessPrepPhrase
SweepNpTrash
WeakAdj
PureCoordConj
UniversalPrn
ConjInNp
Transition
Factive
StrayAdj
DemonsAdj
DemonstrativeModifier
AdverbAfterVerb
AdvInNp
Compromiser
FocusAdv The result is now placed in the main topic extraction output area.

Main Thematic Topic

The main thematic topic is an extended classification of the previous thematic group. If the topic group is located in the actual 'thematic topic' position of the sentence, and not in a secondary focus position, then the main topic group is copied to this output area. This identifies the topic group not only as the main thematic topic of the sentence, but also indicates that it was in the strongest thematic position within the sentence.

Secondary Thematic Topic

The main thematic topic is copied to this output area, and any non-critical supporting information is removed. This moves the topic to just its main head, if possible. This is determined by checking the theme assessments for a 'strong noun' classification. If the topic's head noun is classified as a strong noun, then the supporting information is removed. Otherwise, it stays at this level. If there is nothing in the main thematic topic output area, this output area will also be empty.

Main Developed Topic

This output area copies the main thematic topic into it as long as the main thematic topic head has been a main thematic topic head within the last 20 topics. This indicates that this main topic is one that is not only prominent in the sentence, but also in the discourse at this point.

Main Proximity-Developed Topic

Whenever a main developed topic appears for a second time with a user specfed range of text, it is output to the main proximity-developed topic. This output indicates that it is not only a main focal point within the document, but is being reinforced through the writing.

Content Extraction

The final phase of thematic output processing is to identify certain major thematic points in a sentence. This is a superset of the detailed thematic elements, being those that are notably important for turning free form text into structured database fields. The following outputs are produced:

Thematic Head Words
Proper Names
Descriptions
Named Topics
Topic Indicators
Definitions
Developed Proper Names Thematic Head Words This output indicates that the identified word locations is a main focal point for a strong noun phrase. A strong noun phrase can either be a strong noun head or a noun head with strong support. Only the actual head word is specifically identified. Certain words that were initially flagged as strong or strong with support are removed from this list. The logic for this output is as follows:

```
+noun and
–pronoun and
(+strong noun or + strong support or + knowledgebase concept or
(+gerund and simple subject)) and
–time noun and
–numbers and
–digits and
(+knowledgebase concept or
not((+gerund or participle) and
(–simple subject or -verb phrase))) and
–pro verb and
–perfective verb
```

If this condition is evaluated as true, then the word position is output to this area. Additionally, any adverbs that are marked as topicalizers are also flagged in this area. An example of these words is:

linguistically
aerodynamically

Proper Names

In this output area all of the proper names and places in the sentence are stored. Time nouns are excluded.

Descriptions

The 'description' output specifically identifies every set of noun plus descriptor. These appear as an appositive. Both sides of the description are stored. They must be able to express an equation of 'term1 is a term2'. An example of such a sentence that would generate these conditions is:
John Smith, a market analyst at Big Company, said . . .
This sentence will generate:
Term1(John Smith) is a Term2(market analysts)
Named Topics
This output area indicates topics that are specifically named in the context of a sentence. An example is:
This is a story about bears.
'Bears' is assigned to this output area.
Topic Indicators
This output area contains all strong orienter words. These are words that indicate a field of study or industry, such as:
computer software
prime interest rate
terrorist abduction
These words indicate the highest possible thematic significance in sentences.
Definitions
This output stores words that are defined in the context of the sentence with a 'be' verb relationship. An example of such a sentence is:
A bear is an animal that lives in the forest.
This would generate two terms with an 'isa' relationship:
Term1(bears) isa Term2(animals)
Developed Proper Names
This output indicates each proper name identified in 'Proper Names' above that mentioned more than one time within a user specified length of text. Although the present invention has been described in terms of a prefered embodiment, it will be appreciated that various modifications and alterations might be made by those skilled in the art without departing from the spirit and scope of the invention. The invention should therefore be measured in terms of the claims which follow.

What is claimed is:

1. A method for dynamic classification of input discourse, said method comprising the steps of:
   storing a plurality of hierarchically arranged categories that form a static hierarchy;
   processing said input discourse to identify a plurality of content carrying words;
   generating at least one theme for said input discourse;
   selecting one of said categories from said static hierarchy to classify said theme;
   generating at least one dynamic category based on said content carrying words, wherein said dynamic category defines a greater level of detail than said categories in said static hierarchy; and
   generating a link between said dynamic hierarchy and said static hierarchy to form a detailed classification hierarchy, wherein terminology from said input discourse is utilized to classify said input discourse.

2. The method as set forth in claim 1, further comprising the steps of:
   generating a plurality of dynamic categories based on said content carrying words; and
   generating at least one dynamic hierarchy from said dynamic categories that reflects hierarchical relationships among said dynamic categories.

3. The method as set forth in claim 2, wherein the step of generating at least one dynamic hierarchy comprises the steps of:
   identifying a plurality of head words from said content carrying words;
   generating, for each head word, contextual relationships based on use of each head word in said input discourse; and
   generating a hierarchical relationship among said head words based on common contextual relationships.

4. The method as set forth in claim 2, wherein said hierarchical relationships among said dynamic categories include semantic or linguistic relationships, such that classification of said terminology in dynamic categories reflect semantic or linguistic relationships between terminology of said input discourse.

5. The method as set forth in claim 1, wherein:
   the step of storing said static hierarchy comprises the step of storing said categories in a plurality of independent ontologies, wherein an ontology comprises a plurality of related categories; and
   the step of classifying terminology of said input discourse comprises the step of referencing dynamic categories from at least two different independent ontologies that relate to said terminology.

6. The method as set forth in claim 1, wherein the step of generating at least one theme for said input discourse comprises the steps of:
   storing a thematic profile for said input discourse that includes a plurality of thematic tags for words in said input discourse, wherein said thematic tags indicate applicability of a plurality of thematic constructions that indicate relative thematic importance of words with other words in said input discourse;
   storing a lexicon comprising a plurality of words and definitional characteristics for said words; and
   generating said at least one theme from words in said input discourse based on existence or non existence of said thematic constructions as indicated by said thematic tags, and based on definitional characteristics of said words as indicated by said lexicon, wherein themes generated identify overall content of said input discourse.

7. A method for dynamically classifying input discourse, said method comprising the steps of:
   storing a plurality of hierarchically arranged categories that form a static hierarchy to classify discourse;
   generating at least one dynamic category based on terminology from said input discourse, wherein said dynamic category defines a greater level of detail than said categories in said static hierarchy; and
   generating a link between said dynamic category and a category of said static hierarchy associated with said dynamic category to form a detailed classification hierarchy, wherein terminology from said input discourse in used to classify said input discourse.

8. The method as set forth in claim 7, further comprising the steps of:
   processing said input discourse to identify a plurality of content carrying words;
   generating a plurality of dynamic categories based on said content carrying words; and
   generating at least one dynamic hierarchy from said dynamic categories that reflects hierarchical relationships among said dynamic categories.

9. The method as set forth in claim 8, wherein the step of generating at least one dynamic hierarchy comprises the steps of:
   identifying a plurality of head words from said content carrying words;
   generating, for each head word, contextual relationships based on use of each head word in said input discourse; and
   generating a hierarchical relationship among said head words based on common contextual relationships.

10. The method as set forth in claim 8, wherein said hierarchical relationships among said dynamic categories include semantic or linguistic relationships, such that classification of said terminology in dynamic categories reflect semantic or linguistic relationships among terminology of said input discourse.

11. A method for dynamically classifying input discourse, said method comprising the steps of:

storing a plurality of hierarchically arranged categories that form a static hierarchy, said categories of said static hierarchy representing high level concepts;

processing said input discourse to identify a plurality of content carrying words;

generating a classification for a portion of said carrying words by mapping applicable content carrying words to categories of said static hierarchy;

generating at least one dynamic category from content carrying words that do not map to said categories of said static hierarchy, wherein said dynamic category defines a greater level of detail than said categories in said static hierarchy; and generating a link between said dynamic category and a category of said static hierarchy based on contextual use of a respective content carry word in said input discourse.

12. A computer readable medium comprising a set of instructions stored therein, which when executed by a computer, causes the computer to perform the steps of:

storing a plurality of hierarchically arranged categories that form a static hierarchy;

processing said input discourse to identify a plurality of content carrying words;

generating at least one theme for said input discourse;

selecting one of said categories from said static hierarchy to classify said theme;

generating at least one dynamic category based on said content carrying words, wherein said dynamic category defines a greater level of detail than said categories in said static hierarchy; and generating a link between said dynamic hierarchy and said static hierarchy to form a detailed classification hierarchy, wherein terminology from said input discourse is utilized to classify said input discourse.

13. The computer readable medium as set forth in claim 12, further comprising instructions for:

generating a plurality of dynamic categories based on said content carrying words; and generating at least one dynamic hierarchy from said dynamic categories that reflects hierarchical relationships among said dynamic categories.

14. The computer readable medium as set forth in claim 13, wherein instructions for generating at least one dynamic hierarchy comprise instructions for:

identifying a plurality of head words from said content carrying words;

generating, for each head word, contextual relationships based on use of each head word in said input discourse; and generating a hierarchical relationship among said head words based on common contextual relationships.

15. The computer readable medium as set forth in claim 13, wherein said hierarchical relationships among said dynamic categories include semantic or linguistic relationships, such that classification of said terminology in dynamic categories reflect semantic or linguistic relationships between terminology of said input discourse.

16. The computer readable medium as set forth in claim 12, wherein:

the instructions for storing said static hierarchy comprise instructions for storing said categories in a plurality of independent ontologies, wherein an ontology comprises a plurality of related categories; and the instructions for classifying terminology of said input discourse comprise instructions for referencing dynamic categories from at least two different independent ontologies that relate to said terminology.

17. The computer readable medium as set forth in claim 12, wherein the instructions for generating at least one theme for said input discourse comprise instructions for:

storing a thematic profile for said input discourse that includes a plurality of thematic tags for words in said input discourse, wherein said thematic tags indicate applicability of a plurality of thematic constructions that indicate relative thematic importance of words with other words in said input discourse;

storing a lexicon comprising a plurality of words and definitional characteristics for said words; and generating said at least one theme from words in said input discourse based on existence or non existence of said thematic constructions as indicated by said thematic tags, and based on definitional characteristics of said words as indicated by said lexicon, wherein themes generated identify overall content of said input discourse.

18. A computer readable medium comprising a set of instructions stored therein, which when executed by a computer, causes the computer to perform the steps of:

storing a plurality of hierarchically arranged categories that form a static hierarchy to classify discourse;

generating at least on dynamic category based on terminology from said input discourse, wherein said dynamic category defines a greater level of detail than said categories in said static hierarchy; and generating a link between said dynamic category and a category of said static hierarchy associated with said dynamic category to form a detailed classification hierarchy, wherein terminology from said input discourse is used to classify said input discourse.

19. The computer readable medium as set forth in claim 18, further comprising instructions for:

processing said input discourse to identify a plurality of content carrying words;

generating a plurality of dynamic categories based on content carrying words; and generating at least one dynamic hierarchy from said dynamic categories that reflects hierarchical relationships among said dynamic categories.

20. The computer readable medium as set forth in claim 19, wherein instructions for generating at least one dynamic hierarchy comprise instructions for:

identifying a plurality of head words from said content carrying words;

generating, for each head word, contextual relationships based on use of each head word in said input discourse; and generating a hierarchical relationship among said head words based on common contextual relationships.

21. The computer readable medium as set forth in claim 19, wherein said hierarchical relationships among said dynamic categories include semantic or linguistic relationships, such that classification of said terminology in dynamic categories reflect semantic or linguistic relationships among terminology of said input discourse.

22. An apparatus for dynamically classifying input discourse, said apparatus comprising:
- a storage device for storing a plurality of hierarchically arranged categories that form a static hierarchy; and
- a content indexing processor coupled to said storage device for generating at least one dynamic category based on terminology from said input discourse, wherein said dynamic category defines a greater level of detail than said categories in said static hierarchy, and for generating a link between said dynamic category and a category of said static hierarchy associated with said dynamic category.

* * * * *